United States Patent

Yoda et al.

[11] Patent Number: 6,119,117
[45] Date of Patent: Sep. 12, 2000

[54] DOCUMENT MANAGEMENT METHOD, DOCUMENT RETRIEVAL METHOD, AND DOCUMENT RETRIEVAL APPARATUS

[75] Inventors: Nobuhisa Yoda, Kawasaki; Shiro Takagi, Tokyo; Hiroshi Watanabe, Kawasaki; Kazuaki Kidokoro, Yokohama, all of Japan

[73] Assignee: Kabushiki Kaisha Toshiba, Kawasaki, Japan

[21] Appl. No.: 09/015,761

[22] Filed: Jan. 29, 1998

[30] Foreign Application Priority Data

Jul. 15, 1997 [JP] Japan ................................ 9-189927
Jul. 15, 1997 [JP] Japan ................................ 9-189928

[51] Int. Cl.⁷ .................................................. G06F 17/30
[52] U.S. Cl. ................................ 707/10; 707/1; 707/2; 707/100; 707/203
[58] Field of Search .................................. 364/900, 140; 395/140, 200.31, 772; 707/203, 511, 1, 2, 10, 100, 205, 204, 507

[56] References Cited

U.S. PATENT DOCUMENTS

| | | |
|---|---|---|
| 5,008,853 | 4/1991 | Bly et al. ............................. 364/900 |
| 5,379,423 | 1/1995 | Mutoh et al. ........................ 707/204 |
| 5,469,538 | 11/1995 | Razdow ............................... 395/140 |
| 5,671,428 | 9/1997 | Muranaga et al. .................. 395/772 |
| 5,835,911 | 11/1998 | Nakagawa et al. ................. 707/203 |
| 5,862,325 | 1/1999 | Reed et al. ...................... 395/200.31 |
| 5,870,764 | 2/1999 | Lo et al. .............................. 707/203 |
| 5,893,124 | 4/1999 | Ogaki et al. ........................ 707/507 |
| 5,893,128 | 4/1999 | Nauckhoff ........................... 707/511 |
| 5,918,226 | 6/1999 | Tarumi et al. ........................ 707/10 |

FOREIGN PATENT DOCUMENTS

| | | |
|---|---|---|
| 8-63465 | 3/1996 | Japan . |
| 9-101990 | 4/1997 | Japan . |

Primary Examiner—Wayne Amsbury
Assistant Examiner—Thuy Pardo
Attorney, Agent, or Firm—Finnegan, Henderson, Farabow, Garrett & Dunner, L.L.P.

[57] ABSTRACT

Document information on each document is registered On the other hand, a journal of operations by a user is acquired, where the journal of operations involves the contents of a job indicating which document and how it has been used during the job execution. Job information on each job is registered such that the job information includes, as an attribute, the contents of the job in the acquired journal of operations. Use of such job information and document information enables a job to be retrieved from the documents or a document to be retrieved from the jobs in accordance with the specification by the operator.

20 Claims, 28 Drawing Sheets

| DOCUMENT ID | DOCUMENT NAME | CREATOR | CREATION TIME | ADDRESS FOR BODY |
|---|---|---|---|---|
| D001 | CATALOG | TONY | 1997.05.11 10:00 | (EX:FILE NAME) |
| D002 | MEMO 1 | LUCY | 1997.05.12 11:00 | |
| D003 | MEMO 2 | JACK | 1997.05.13 15:00 | |
| D004 | ORGANIZING CATALOGS | LUCY | 1997.05.13 10:30 | |
| ⋮ | ⋮ | ⋮ | ⋮ | ⋮ |
| D100 | DOCUMENT 22 | TONY | 1997.05.17 10:00 | |
| ⋮ | ⋮ | ⋮ | ⋮ | ⋮ |

| JOB ID | JOB NAME | USER NAME | CONTENTS OF JOB ||||
| | | | TIME | OPERATION TYPE | DOCUMENT ID | COMMENT |
| --- | --- | --- | --- | --- | --- | --- |
| J001 | ORGANIZING CATALOGS | LUCY | 1997.05.12 10:00 | REFERENCE | D001 | |
| | | | 1997.05.12 11:00 | CREATION | D002 | MAIL NOTICE TO TONY |
| J002 | REVISING MEMO | JACK | 1997.05.13 13:00 | REFERENCE | D001 | |
| | | | 1997.05.13 14:00 | REFERENCE | D002 | |
| | | | 1997.05.13 15:00 | CREATION | D003 | MAIL NOTICE TO LUCY |
| ... | ... | ... | ... | ... | ... | ... |

FIG. 4

| TIME | USER NAME | OPERATION TYPE | DOCUMENT ID |
|---|---|---|---|
| ⋮ | ⋮ | ⋮ | ⋮ |
| 1997.05.13 10:01 | LUCY | REFERENCE | D001 |
| 1997.05.13 11:30 | LUCY | CREATION | D004 |
| ⋮ | ⋮ | ⋮ | ⋮ |
| 1997.05.13 13:10 | JACK | REFERENCE | D004 |
| 1997.05.13 13:20 | JACK | REFERENCE | D001 |
| 1997.05.13 13:30 | JACK | LOGOUT | |
| ⋮ | ⋮ | ⋮ | ⋮ |

MONITOR:USER NAME TABLE

| USER NAME |
|---|
| LUCY |
| ⋮ |

FIG. 11

JOB REGISTRATION END

| | JOB NAME | USER NAME |
|---|---|---|
| ☑ | CREATING REPORTS | LUCY |
| | ⋮ | ⋮ |

END    CANCEL

FIG. 12

| JOB ID | JOB NAME | USER NAME | CONTENTS OF JOB ||||
| --- | --- | --- | --- | --- | --- | --- |
| | | | TIME | OPERATION TYPE | DOCUMENT ID | COMMENT |
| ... | ... | ... | ... | ... | ... | ... |
| J003 | ORGANIZING CATALOGS | LUCY | 1997.05.13 10:01 | REFERENCE | D001 | |
| | | | 1997.05.13 10:30 | CREATION | D004 | |
| | | | 1997.05.13 10:35 | LOGOUT | | |
| J004 | CHECKING JOB | JACK | 1997.05.13 13:10 | REFERENCE | D004 | |
| | | | 1997.05.13 13:20 | REFERENCE | D001 | |
| | | | 1997.05.13 13:30 | LOGOUT | | |
| ... | ... | ... | ... | ... | ... | ... |

FIG. 15

```
JOB RETRIEVAL

JOB NAME:    [ *        ]
USER NAME:   [ LUCY     ]
PERIOD:      [ *        ] ~ [ *        ]

[RETRIEVE                              [CANCEL]
 JOBS]
```

FIG. 16

```
JOB LIST

| JOB NAME   | USER NAME | JOB DURATION TIME              |
[✓]     | ORGANIZING | LUCY      | 1997.05.12   ~  1997.05.12     |
        | CATALOGS   |           |   10:00            11:00       |
        |    ⋮       |    ⋮      |       ⋮                        |

[RETRIEVE RELATED]   [EDITING JOBS]              [CANCEL]
[DOCUMENTS      ]
```

FIG. 17

| JOB EDITING | | | |
|---|---|---|---|
| JOB NAME:ORGANIZING CATALOGS USER NAME:LUCY | | | |
| TIME | OPERATION TYPE | DOCUMENT ID | COMMENT |
| 1997.05.12 10:00 | REFERENCE | D001 | |
| 1997.05.12 11:00 | CREATION | D002 | MAIL NOTICE TO TONY |

UPDATE  DELETE  CANCEL

FIG. 20

| RELATED DOCUMENT RETRIEVAL LIST | | | | | |
|---|---|---|---|---|---|
| JOB NAME:ORGANIZING CATALOGS USER NAME:LUCY PERIOD:1997.05.12 ~ 1997.05.12 10:00      11:00 | | | | | |
| | DOCUMENT NAME | CREATOR | CREATION TIME | OPERATION TYPE | COMMENT |
| ☑ | CATALOG(D001) | TONY | 1997.05.11 10:00 | REFERENCE | |
| ☐ | MEMO 1(D002) | LUCY | 1997.05.12 11:00 | CREATION | MAIL NOTICE TO TONY |

RETRIEVE RELATED JOBS   DISPLAY CONTENTS-OF-DOCUMENT   CANCEL

FIG. 22

RELATED JOB RETRIEVAL LIST

DOCUMENT NAME:CATALOG
CREATOR:TONY
CREATION TIME:1997.05.11  10:00

| | JOB NAME | USER NAME | TIME | OPERATION TYPE |
|---|---|---|---|---|
| ☐ | ORGANIZING CATALOGS | LUCY | 1997.05.12 ~ 1997.05.12<br>10:00    11:00 | REFERENCE |
| ☑ | REVISING MEMO | JACK | 1997.05.13 ~ 1997.05.13<br>13:00    15:00 | REFERENCE |
| | ⋮ | ⋮ | ⋮ | ⋮ |

[RETRIEVE RELATED DOCUMENTS]  [DISPLAY CONTENTS-OF-JOB]  [CANCEL]

FIG. 24

RELATED DOCUMENT RETRIEVAL LIST

JOB NAME: REVISING MEMO
USER NAME: JACK
PERIOD: 1997.05.13 ~ 1997.05.13
　　　　　　13:00　　　　15:00

| | DOCUMENT NAME | CREATOR | CREATION TIME | OPERATION TYPE | COMMENT |
|---|---|---|---|---|---|
| ☐ | CATALOG(D001) | TONY | 1997.05.11 10:00 | REFERENCE | |
| ☐ | MEMO 1(D002) | LUCY | 1997.05.12 11:00 | REFERENCE | |
| ☐ | MEMO 2(D003) | JACK | 1997.05.13 15:00 | CREATION | MAIL NOTICE TO LUCY |

[RETRIEVE RELATED JOBS] [DISPLAY CONTENTS-OF-DOCUMENT]　　　[CANCEL]

| USER NAME | MONITOR RULE | | | REGISTRATION RULE | |
|---|---|---|---|---|---|
| | JOB DURATION TIME | OPERATION TYPE | DOCUMENT NAME | DELIMITER | JOB NAME |
| LUCY | * | REFERENCE CREATION | * | DOCUMENT CREATION | CREATED DOCUMENT NAME |
| JACK | AFTERNOON | REFERENCE LOGOUT | * | LOGOUT | FIXED (CHECKING JOB) |
| ⋮ | ⋮ | ⋮ | ⋮ | ⋮ | ⋮ |

25

JOB MANAGEMENT TOOL

SET JOB ANALYSIS

RETRIEVE JOBS       END

11

JOB ANALYSIS SETTING

| USER NAME | MONITOR RULE | | | REGISTRATION RULE | |
|---|---|---|---|---|---|
| | JOB DURATION TIME | OPERATION TYPE | DOCUMENT NAME | DELIMITER | JOB NAME |
| LUCY | * | * | * | DOCUMENT CREATION | CREATED DOCUMENT NAME |
| JACK | AFTERNOON | REFERENCE LOGOUT | * | LOGOUT | FIXED (CHECKING JOB) |
| ... | ... | ... | ... | ... | ... |

UPDATE    CANCEL

FIG. 32

| JOB NAME | USER NAME | JOB DURATION TIME | |
|---|---|---|---|
| ORGANIZING CATALOGS | LUCY | 1997.05.12 10:00 | ~ 1997.05.12 11:00 |
| ⋮ | ⋮ | ⋮ | |

JOB LIST

☑

RETRIEVE RELATED DOCUMENTS | EDIT JOBS | CANCEL

INTEGRATE JOBS | DIVIDE JOBS

FIG. 37

DOCUMENT MANAGEMENT METHOD, DOCUMENT RETRIEVAL METHOD, AND DOCUMENT RETRIEVAL APPARATUS

BACKGROUND OF THE INVENTION

The present invention relates to a document management method, a document retrieval method, and a document retrieval apparatus, and a storage medium used for executing document management or retrieval.

As for a document retrieval apparatus with document storage means used to register or retrieve a document, there has been an apparatus for retrieving a document on the basis of the keyword attached to the document in registering the document or an apparatus for retrieving a document on the basis of the text or image of the document itself as disclosed in Jpn. Pat. Appln. KOKAI Publication No. 9-101990 (an information filtering apparatus).

There has also been an apparatus capable of recording the names of the documents referred to and the time when the documents were referred to in editing (creating) a document, as journal information on the edited document, as disclosed in Jpn. Pat. Appln. KOKAI Publication No. 8-63465 (a reference journal display apparatus).

All of the aforementioned prior-art techniques, however, have the following problem: users cannot retrieve a document based on information regarding the relations and uses of the document, such as when and for what purpose who has created, referred to, modified, or updated the document, and registered it as a new document. This prevents users from retrieving the desired document efficiently with high reliability.

Specifically, with a conventional apparatus for retrieving a document in accordance with the keyword attached in registering the document, because the document is retrieved on the basis of only the keyword, a document to be retrieved is determined uniquely by the keyword, not taking into account retrieval conditions for, for example, the relations of workers who create or refer to the document. Therefore, the desired document may not be retrieved reliably. This makes it impossible to implement a highly reliable document retrieval functionality. Depending on the contents of the keyword and the number of keywords, there are many documents that could match the query. In that case, it is necessary to select the desired one through visual inspection, which requires a lot of time and labor, resulting in an inefficient retrieval work.

Furthermore, in the case of the conventional apparatus disclosed in Jpn. Pat. Appln. KOKAI Publication No. 9-101990 (an information filtering apparatus), when articles including text and images are delivered, pieces of information with a high degree of similarity can be retrieved and added to the articles. The pieces of information are filtered simply based on the degree of similarity found by a specific algorithm. Accordingly, with this type of apparatus, too, retrieval conditions for, for example, the relations of workers who create or refer to the document are not taken into account at all. This makes it impossible to achieve the function of retrieving the desired document reliably, preventing the document from being retrieved efficiently with high reliability.

Moreover, with the conventional apparatus disclosed in Jpn. Pat. Appln. KOKAI Publication No. 8-63465 (a reference journal display apparatus), there has been provided journal recording means for monitoring the reference action carried out by reference information display means and recording the monitoring result together with the time. The journal recording means enables users to refer to documents, as the need arises. This makes it possible for users to retrieve the documents which an author referred to while creating a specified document. However, it does not make possible for users to retrieve the created document on the basis of the documents which the author referred to while creating the document. Because it is a one-way retrieval function that enables users to retrieve the reference documents only for the specified document, a document other than the specified document, for example, the document created by creator, cannot be retrieved by the retrieval function, unless the name of the specified document is specified definitely. Accordingly, with this type of apparatus, too, retrieval conditions for the relations of workers who create or refer to the document are not taken into account at all. This makes it impossible to achieve the function of retrieving the desired document reliably, preventing the document from being retrieved efficiently with high reliability.

The aforementioned problems are summarized as follows.

With the conventional techniques, the problem of being unable to retrieve the desired document efficiently with high reliability has arisen because no information can be acquired in document management as to the relations and uses of the document being managed, such as when and for what purpose who has created, referred to, modified, or updated the document, and registered it as a new document.

BRIEF SUMMARY OF THE INVENTION

Accordingly, it is an object of the present invention to provide a document management method, a document retrieval method, a document retrieval apparatus, and a storage medium which further include the function of extracting the contents of document-handling jobs and storing them job by job to enable users to retrieve not only related jobs from documents but also related documents from jobs without imposing on the users the burden of operation and thereby enable the users to retrieve the necessary documents and jobs more efficiently and execute various kinds of document-handling jobs efficiently.

It is another object of the present invention to provide a document management method, a document retrieval method, a document retrieval apparatus, and a storage medium which have the function of registering the documents used during a job execution, together with the job name and the user name on the job and a related-document retrieval function and which enable users to retrieve the related documents from the user name on the job or the job name and which further include the function of registering jobs on the basis of a journal of document operations by the user and thereby retrieve the necessary documents efficiently and quickly without imposing on the users the burden of registering jobs.

It is still another object of the present invention to provide a document management method, a document retrieval method, a document retrieval apparatus, and a storage medium which have the function of registering the documents used during a job execution, together with the job name and the user name on the job and a related-job retrieval function and which enable users to retrieve the contents of the related jobs from the document name or the document creator and which further include the function of registering jobs on the basis of a journal of document operations by the user and thereby retrieve the necessary documents efficiently and quickly without imposing on the users the burden of registering jobs.

It is yet still another object of the present invention to provide a document management method, a document retrieval method, a document retrieval apparatus, and a storage medium which have the function of registering the documents used during a job execution, together with the job name and the user name on the job and a related-document retrieval function and a related-job retrieval function both and which enable users to retrieve not only the related documents from the user name on the job or the job name but also the contents of the related jobs from the document name or the document creator and which further include the function of registering jobs on the basis of a journal of document operations by the user and thereby carry out the work of retrieving the necessary documents efficiently and quickly without imposing on the users the burden of registering jobs.

In the present specification, a series of operations or works during which a user operates on document(s) are referred to as a document-handling job or just a job. Various types of operations or works including reference to related documents for the creation of ordinary documents, reference to meal recipe information provided by meal recipe information service and reference to tests and test results, are treated as a job.

According to one aspect of the present invention, there is provided a document management method comprising the steps of: registering document information on each document; acquiring a journal of operations by a user, which involves the contents of a job indicating which document and how it has been used during the job execution; and registering job information on each job such that the job information includes, as an attribute, the contents of the job in the acquired journal of operations.

In the document management method, it is desirable that the job information registered should include not only the contents of the job but also a job name and a user name on the job.

Furthermore, it is desirable that the contents of the job should include document identification information, operation type information, and time information indicating job operation time.

The document management method may further comprise the step of instructing, job by job, the start and end of acquisition for the journal of operations.

The document management method may further comprise the step of specifying an operation type to be targeted to selectively acquire the journal of operations.

The document management method may further comprise the step of specifying a journal acquisition time period to selectively acquire the journal of operations.

The document management method may further comprise the step of specifying a registration rule for a delimiter to extract the delimiter of each job in registering the job information. In this case, the delimiter is represented by an operation type, for example.

The document management method may further comprise the step of specifying a job name of each job in registering the job information.

According to another aspect of the present invention, there is provided a document retrieval method comprising the steps of: registering document information on each document, acquiring a journal of operations by a user, which involves the contents of a job indicating which document and how it has been used during the job execution, and registering job information on each job such that the job information includes, as an attribute, the contents of the job in the acquired journal of operations; and retrieving at least either a job from a document or a document from a job in accordance with the specification by an operator using the job information and the document information.

According to another aspect of the present invention, there is provided a document retrieval method comprising the steps of: registering document information on each document, acquiring a journal of operations by a user, which involves the contents of a job indicating which document and how it has been used during the job execution, and registering job information on each job including a job name and a user name on the job such that the job information includes, as an attribute, the contents of the job in the acquired journal of operations; and creating a list of related documents in accordance with the specification of the job name or the user name on the job by an operator using the job information and the document information.

According to another aspect of the present invention, there is provided a document retrieval method comprising the steps of: registering document information on each document including a document name and a document creator name, acquiring a journal of operations by a user, which involves the contents of a job indicating which document and how it has been used during the job execution, and registering job information on each job such that the job information includes, as an attribute, the contents of the job in the acquired journal of operations; and creating a list of related documents in accordance with the specification of the document name or the document creator name by an operator using the job information and the document information.

According to another aspect of the present invention, there is provided a document retrieval method comprising the steps of: registering document information on each document including a document name and a document creator name, acquiring a journal of operations by a user, which involves the contents of a job indicating which document and how it has been used during the job execution, and registering job information on each job including a job name and a user name on the job such that the job information includes, as an attribute, the contents of the job in the acquired journal of operations; and creating not only a list of related documents in accordance with the specification of the job name or the user name on the job by an operator using the job information and the document information but also a list of related jobs in accordance with the specification of the document name or the document creator name by an operator using the job information and the document information.

In each of the document retrieval methods, it is desirable that the contents of the job should include document identification information, operation type information, and time information indicating job operation time.

Each of the document retrieval methods may further comprise the step of instructing, job by job, the start and end of acquisition for the journal of operations.

Each of the document retrieval methods may further comprise the step of specifying a registration rule for a delimiter to extract the delimiter of each job in registering the job information.

According to another aspect of the present invention, there is provided a document retrieval apparatus comprising: means for storing document information on each document; means for acquiring a journal of operations by a user, which involves the contents of a job indicating which document and how it has been used during the job execution; means for storing job information on each job including a job name and a user name on the job such that the job information includes, as an attribute, the contents of the job in the acquired journal of operations; and means for creating a list of related documents in accordance with the specification of the job name or the user name on the job by an operator using the job information and the document information.

According to another aspect of the present invention, there is provided a document retrieval apparatus comprising: means for storing document information on each document; means for acquiring a journal of operations by a user, which involves the contents of a job indicating which document and how it has been used during the job execution; means for storing job information on each job including a job name and a user name on the job such that the job information includes, as an attribute, the contents of the job in the acquired journal of operations; and means for creating a list of related documents in accordance with the specification of the job name or the user name on the job by an operator using the job information and the document information.

According to another aspect of the present invention, there is provided a document retrieval apparatus comprising: means for storing document information on each document including a document name and a document creator name; means for acquiring a journal of operations by a user, which involves the contents of a job indicating which document and how it has been used during the job execution; means for storing job information on each job including a job name and a user name on the job such that the job information includes, as an attribute, the contents of the job in the acquired journal of operations; and means for creating not only a list of related documents in accordance with the specification of the job name or the user name on the job by an operator using the job information and the document information but also a list of related jobs in accordance with the specification of the document name or the document creator name by an operator using the job information and the document information.

Each of the document retrieval apparatuses may further comprise means for editing the stored contents of jobs.

Each of the document retrieval apparatuses may further comprise means for storing a monitor rule specifying an operation type to be targeted to selectively acquire the journal of operations.

Each of the document retrieval apparatuses may further comprise means for storing a monitor rule specifying a journal acquisition time period to selectively acquire the journal of operations.

Each of the document retrieval apparatuses may further comprise means for storing a registration rule specifying a registration rule for a delimiter to extract the delimiter of each job in registering the job information.

According to another aspect of the present invention, there is provided a storage medium having program code instructions stored thereon which perform document management when executed by a processor, the instructions comprising: registering document information on each document, acquiring a journal of operations by a user, which involves the contents of a job indicating which document and how it has been used during the job execution, and registering job information on each job such that the job information includes, as an attribute, the contents of the job in the acquired journal of operations; and retrieving at least either a job from a document or a document from a job in accordance with the specification by an operator using the job information and the document information.

According to another aspect of the present invention, there is provided a storage medium having program code instructions stored thereon which perform document management when executed by a processor, the instructions comprising: registering document information on each document, acquiring a journal of operations by a user, which involves the contents of a job indicating which document and how it has been used during the job execution, and registering job information on each job including a job name and a user name on the job such that the job information includes, as an attribute, the contents of the job in the acquired journal of operations; and creating a list of related documents in accordance with the specification of the job name or the user name on the job by an operator using the job information and the document information.

According to another aspect of the present invention, there is provided a storage medium having program code instructions stored thereon which perform document management when executed by a processor, the instructions comprising: registering document information on each document including a document name and a document creator name, acquiring a journal of operations by a user, which involves the contents of a job indicating which document and how it has been used during the job execution, and registering job information on each job such that the job information includes, as an attribute, the contents of the job in the acquired journal of operations; and creating a list of related documents in accordance with the specification of the document name or the document creator name by an operator using the job information and the document information.

According to another aspect of the present invention, there is provided a storage medium having program code instructions stored thereon which perform document management when executed by a processor, the instructions comprising: registering document information on each document including a document name and a document creator name, acquiring a journal of operations by a user, which involves the contents of a job indicating which document and how it has been used during the job execution, and registering job information on each job including a job name and a user name on the job such that the job information includes, as an attribute, the contents of the job in the acquired journal of operations; and creating not only a list of related documents in accordance with the specification of the job name or the user name on the job by an operator using the job information and the document information but also a list of related jobs in accordance with the specification of the document name or the document creator name by an operator using the job information and the document information.

Additional objects and advantages of the present invention will be set forth in the description which follows, and in part will be obvious from the description, or may be learned by practice of the present invention. The objects and advantages of the present invention may be realized and obtained by means of the instrumentalities and combinations particularly pointed out in the appended claims.

BRIEF DESCRIPTION OF THE SEVERAL VIEWS OF THE DRAWING

The accompanying drawings, which are incorporated in and constitute a part of the specification, illustrate presently preferred embodiments of the present invention and, together with the general description given above and the detailed description of the preferred embodiments given below, serve to explain the principles of the present invention in which:

FIG. 4 shows an example of the data structure used in the document storage section in each of the first and second embodiments;

FIG. 11 illustrates an example of the monitor user name table accessed by the journal monitoring section in the first embodiment;

FIG. 12 illustrates an example of the job registration end window displayed when the job registration ending process is started in the job management tool process in the first embodiment;

FIG. 15 shows an example of the data structure in the job storage section registered by the job registration section in each of the first and second embodiments;

FIG. 16 illustrates an example of the job retrieval window displayed when the job retrieval process is started in the job management tool in each of the first and second embodiments;

FIG. 17 illustrates an example of the job list window displayed when the job listing process is started in the job retrieval process of the first embodiment;

FIG. 20 illustrates an example of the job editing window displayed when the job editing process is started in the job listing process in each of the first and second embodiments;

FIG. 22 illustrates an example of the related document retrieval list window displayed when the related document retrieval process is started in the job listing process in each of the first and second embodiments;

FIG. 24 illustrates an example of the related job retrieval list window displayed when the related document retrieval process is started in the related document retrieval process in each of the first and second embodiments;

FIG. 32 illustrates an example of the job analysis setting window displayed when the job analysis setting process is started in the job management tool of the second embodiment;

FIG. 37 illustrates an example of the job list window displayed when the job listing process is started in the job retrieval process of the second embodiment.

DETAILED DESCRIPTION OF THE INVENTION

Hereinafter, referring to the accompanying drawings, embodiments of the present invention will be explained.

[First Embodiment]

Figures 1, 3:
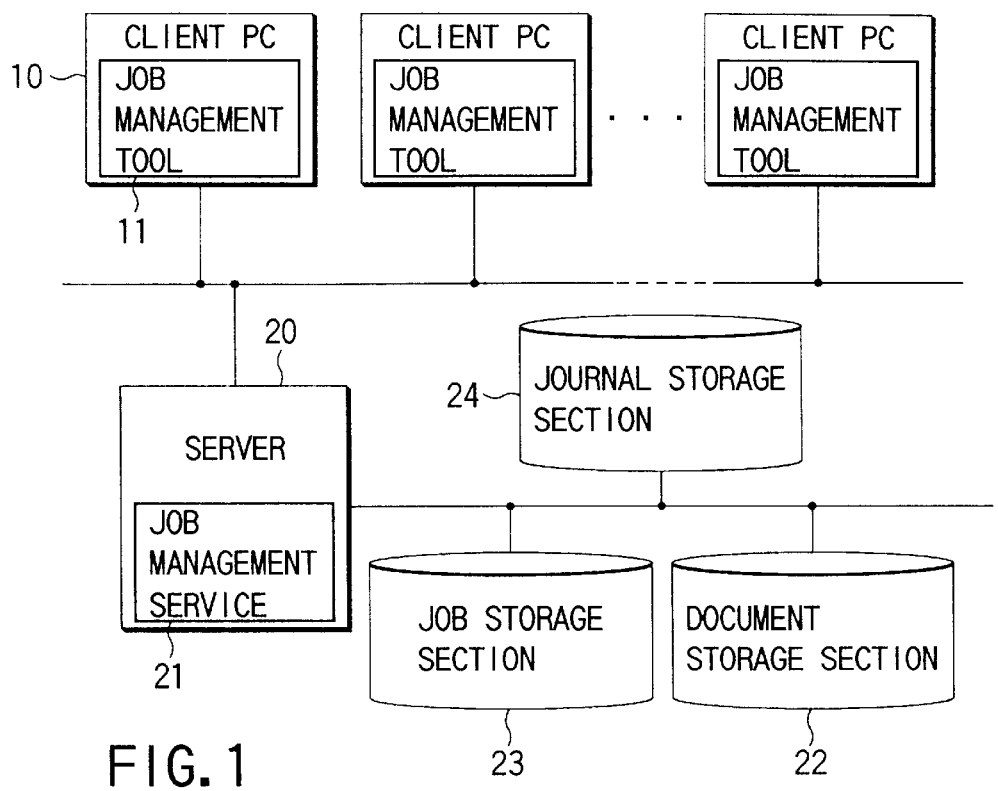
FIG. 1 is a block diagram of the overall system configuration of a first embodiment according to the present invention.
FIG. 3 shows an example of the data structure used in the document storage section in each of the first and second embodiments.

FIG. 1 is a block diagram of the overall system configuration of a first embodiment according to the present invention.

In FIG. 1, numerals 10 and 20 indicate personal computers connected to each other via a communication channel (L). Numeral 10 indicates a client-side personal computer processor (hereinafter, referred to as a client PC) and numeral 20 indicates a server-side personal computer processor (hereinafter, referred to as a server).

Numeral 11 indicates a job management tool for providing a job management function of the invention. The job management tool is installed in the client PC 10. Numeral 21 indicates a job management service module for realizing a job management function of the present invention. The job management service module is executed in the server 20.

The job management tool 11 provided for the client PC 10 and the job management service module 21 provided for the server 20 together consist of processing section shown in FIG. 2, which will be explained later.

Numeral 22 indicates a document storage section used to register or retrieve a document. The document storage section is provided for the server 20 and used to build a document database. The data structure of the database will be explained later.

Numeral 23 is a job storage section that is provided for the server 20 and used to build a job database. The job storage section 23 stores, job by job, the contents of jobs, the job names, and the user names on jobs. The contents of jobs include pieces of event information on reference to or the creation of documents. The data structure of the job storage section will be explained later.

Numeral 24 indicates a journal storage section that stores operation journals of how the users have operated on the documents. It is assumed that the journals of document operations monitored by a journal monitoring section 3m explained later are recorded and stored on a user name basis. The data structure of the journal storage section will be explained later.

Figure 2:
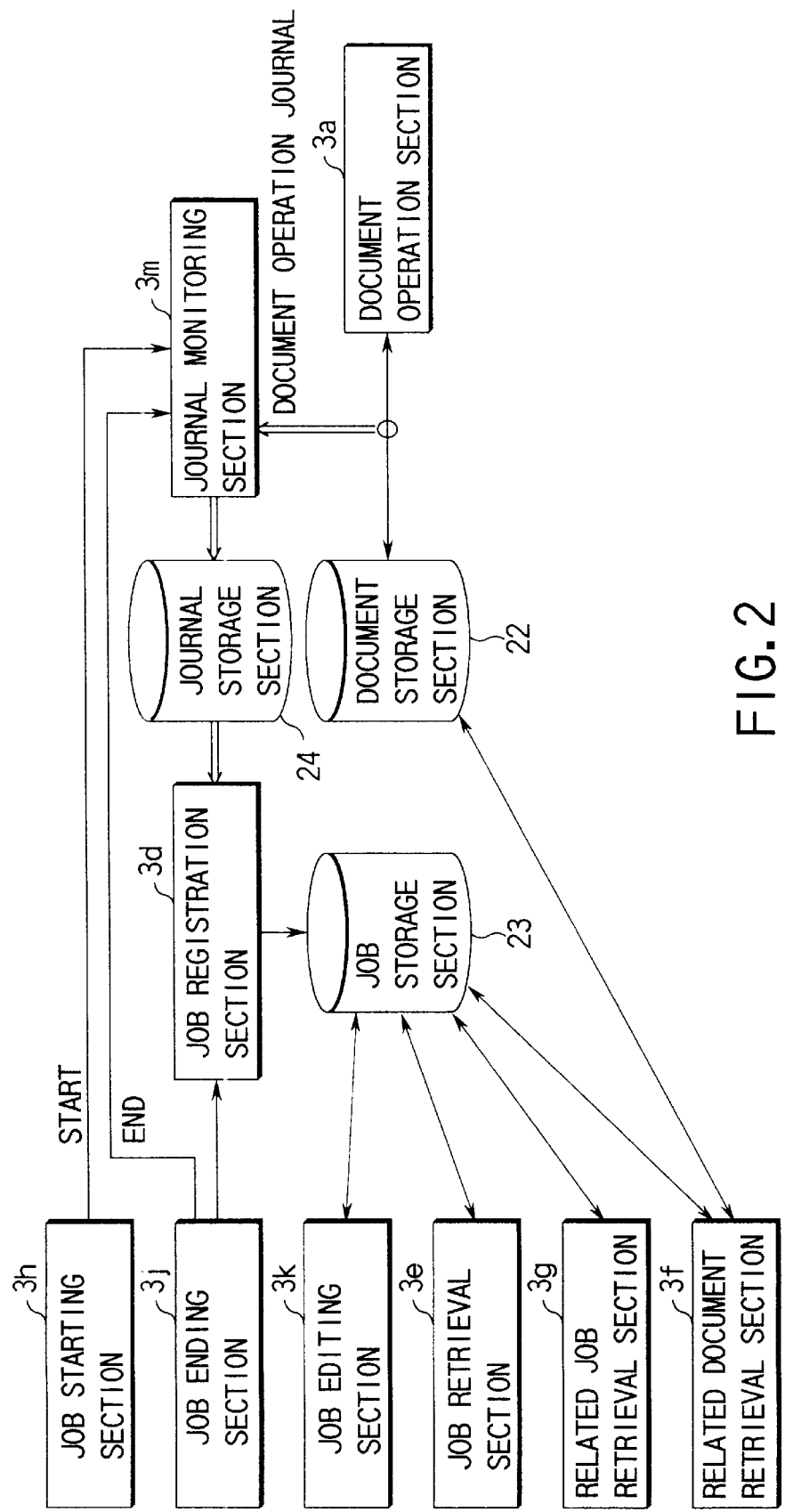
FIG. 2 is a block diagram of the main sections of the first embodiment.

FIG. 2 is a block diagram of the main sections of the first embodiment.

In FIG. 2, reference symbols 3a, 3d, . . . , 3m each indicate a processing section having a specific processing function realized by the job management tool 11 provided for the client PC 10 or the job management service module 21 provided for the server 20. Of the reference symbols, 3a indicates a document operation section that retrieves or registers documents and 3m represents a journal monitoring section that monitors how the user has operated a document at the document operation section 3a and stores the contents of the document operations into the journal storage section 24.

Reference symbol 3d represents a job registration section that registers the contents of jobs in the job storage section 23 on the basis of the journal of document operations in the journal storage section 24 related to the user name specified by the user. Reference symbol 3e indicates a job retrieval section that retrieves a job from the job name or the user name on the job.

Reference symbol 3f indicates a related document retrieval section that retrieves the related documents referred to or created in the job. A related job retrieval section 3g retrieves from a document the related jobs that have referred to or created the document.

Reference symbol 3h represents a job starting section that requests the journal monitoring section to start monitoring the journal of document operations related to the user name specified by an operator. A job ending section 3j requests the job registration section 3d to register the contents of the job related to the specified user name.

Reference symbol 3k indicates a job editing section that edits the job names, the user name, and the contents of jobs in the job storage section 23.

Each of the above sections is executed by the CPU of the client PC 10 or that of the server 20. The interaction with the user is realized by a display and a keyboard or a mouse (not shown) provided for the personal computer (PC). The storage sections provided for the server 20 are formed in a hard disk drive (HDD) (not shown). Alternatively, they may be formed on, for example, other storage devices connected to the network.

Since the document operation section 3a has the same configuration as in an existing system configuration, its explanation will not be given.

The processing function shown in each of the flowcharts explained later can be realized by a storage medium, such as a magnetic disk, having program code instructions stored thereon which performs the above processing when executed by a processor in a computer. That is, the processing function in each flowchart can be realized by the client PC 10 or the server 20.

The operation of the first embodiment will be explained by reference to each of the above drawings.

As shown in FIG. 3, the document storage section 22 stores, as one unit of a document, a document ID acting as an identifier specifying a document uniquely, the name of the document, the name of the creator who has created the document, the creation time, and the address for the body of the document or the contents of the document in such a manner that they are associated with each other.

In an example shown in FIG. 3, a document with "DOCUMENT ID: D001", "DOCUMENT NAME: CATALOG", "CREATOR: TONY", "CREATION TIME: 10:00, MAY 11, 1997" is stored as a first document.

As shown in FIG. 4, the job storage section 23 stores, as one unit of a job, a job ID acting as an identifier specifying a job uniquely, the job name, the user name on the job, and the contents of the job in such a manner that they are associated with each other.

The related document IDs, the access types indicating whether the documents have been referred to or created, the time when the user operated on the document, and the comments the user can set freely are stored as the contents of the job.

In an example shown in FIG. 4, "JOB ID: J001", "JOB NAME: ORGANIZATING CATALOGS", and "USER NAME: LUCY" are stored as a first job. The contents of the job contain user-operation information for each document. The first document has "DOCUMENT ID: D001", "TIME: 10:00, MAY 12, 1997", and "OPERATION TYPE: REFERENCE". The second document has "DOCUMENT ID: D002", "TIME: 11:00, MAY 12, 1997", "OPERATION TYPE: CREATION", and "COMMENT: MAIL NOTICE TO TONY". As a second job, too, similar pieces of information are stored.

Figures 5, 6:
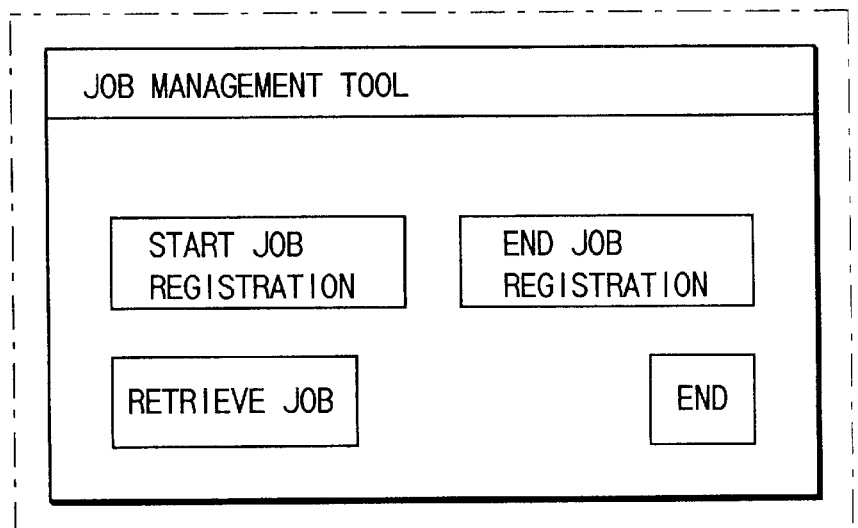
FIG. 5 shows an example of the data structure used in the document storage section in each of the first and second embodiments.
FIG. 6 illustrates an example of the job management tool window displayed at the time of system start-up in the first embodiment.

Furthermore, as shown in FIG. 5, the journal storage section 24 stores, as one unit of a journal, the time when a document was operated on, the user who operated on the document, and the document ID in such a manner that they are associated with each other. The operation type includes the creation of a document, reference to a document, and logout.

In an example of FIG. 5, a journal of what LUCY and JACK did on May 13, 1997 has been stored.

An example of document operations by use of the apparatus of the first embodiment will be described using the windows displayed on the display and the flowcharts.

An example of the window layout of the job management tool 11 displayed at the time of system start-up is shown in FIG. 6.

On the window, the buttons for "START JOB REGISTRATION", "END JOB REGISTRATION", "RETRIEVE JOB", and "END" are displayed. One of them can be chosen by operating the keyboard or mouse to start the process corresponding to the chosen button.

Figure 7:
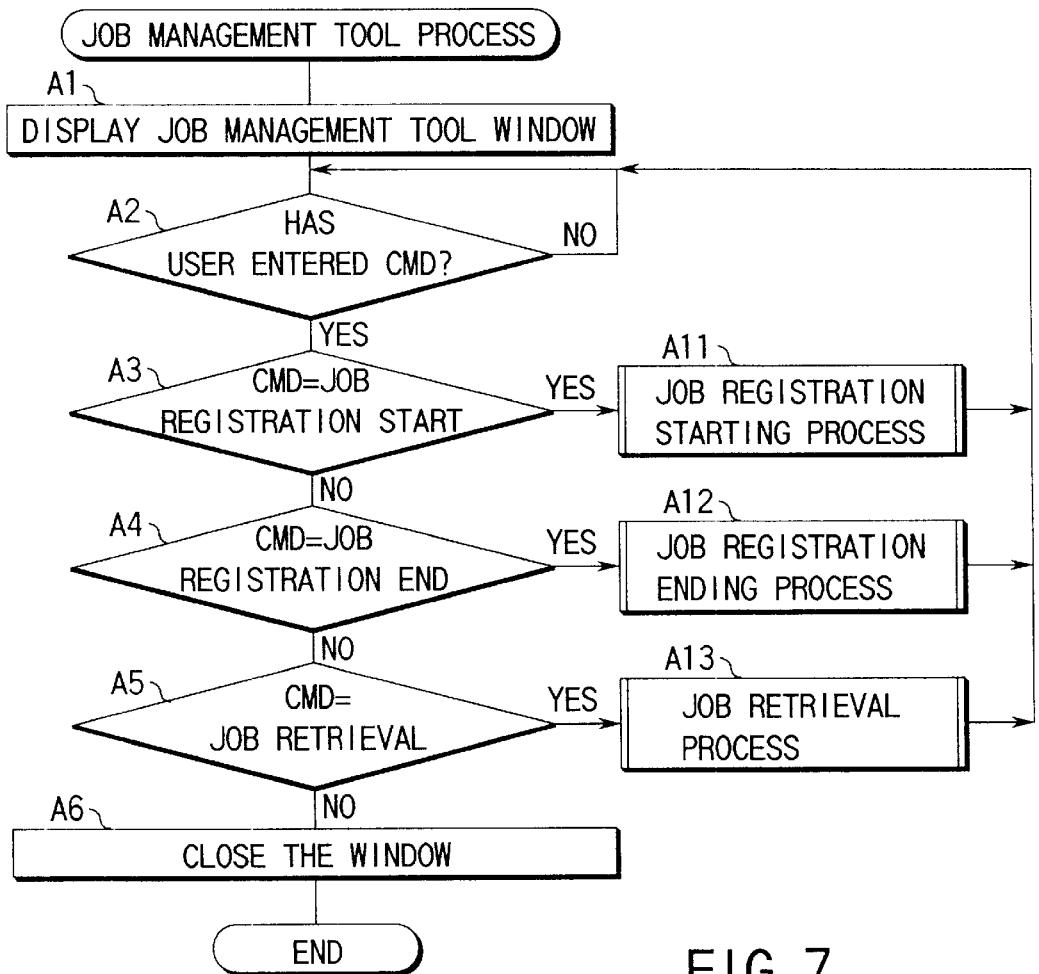
FIG. 7 is a flowchart of the procedure for the job management tool process in the first embodiment.

The flowchart of FIG. 7 shows the procedure performed by the job management tool 11.

The job management tool 11 first causes the job management window of FIG. 6 to appear (step A1 of FIG. 7) and waits for the user to enter a command (CMD) (step A2). In accordance with the inputted command (CMD) (steps A3 to A5), the job management tool causes the job registration starting section 3d to start the job registration starting process (step A11), the job registration ending section 3j to start the job registration ending process (step A12), the job retrieval section 3e to start the job retrieval process (step A13), or the window to be closed to end the process (step A6).

Figure 8:
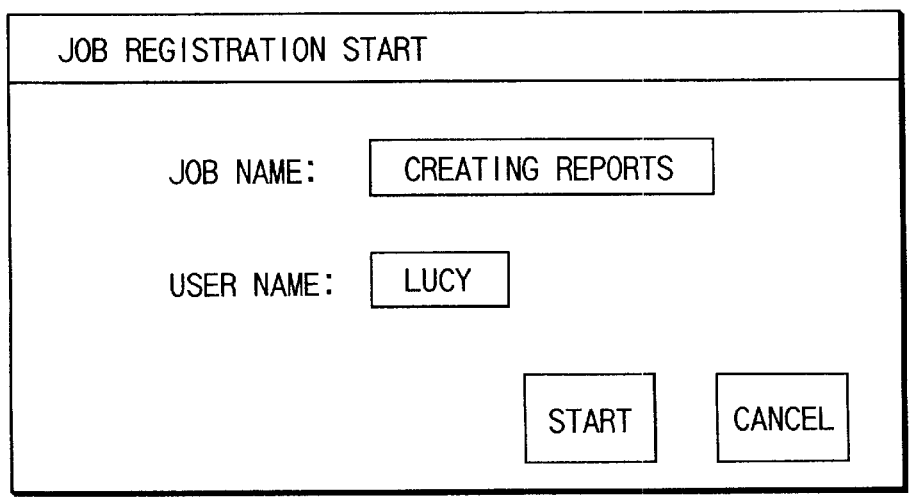
FIG. 8 illustrates an example of the job registration start window displayed when the job registration starting process is started in the job management tool process in the first embodiment.
Figure 9:
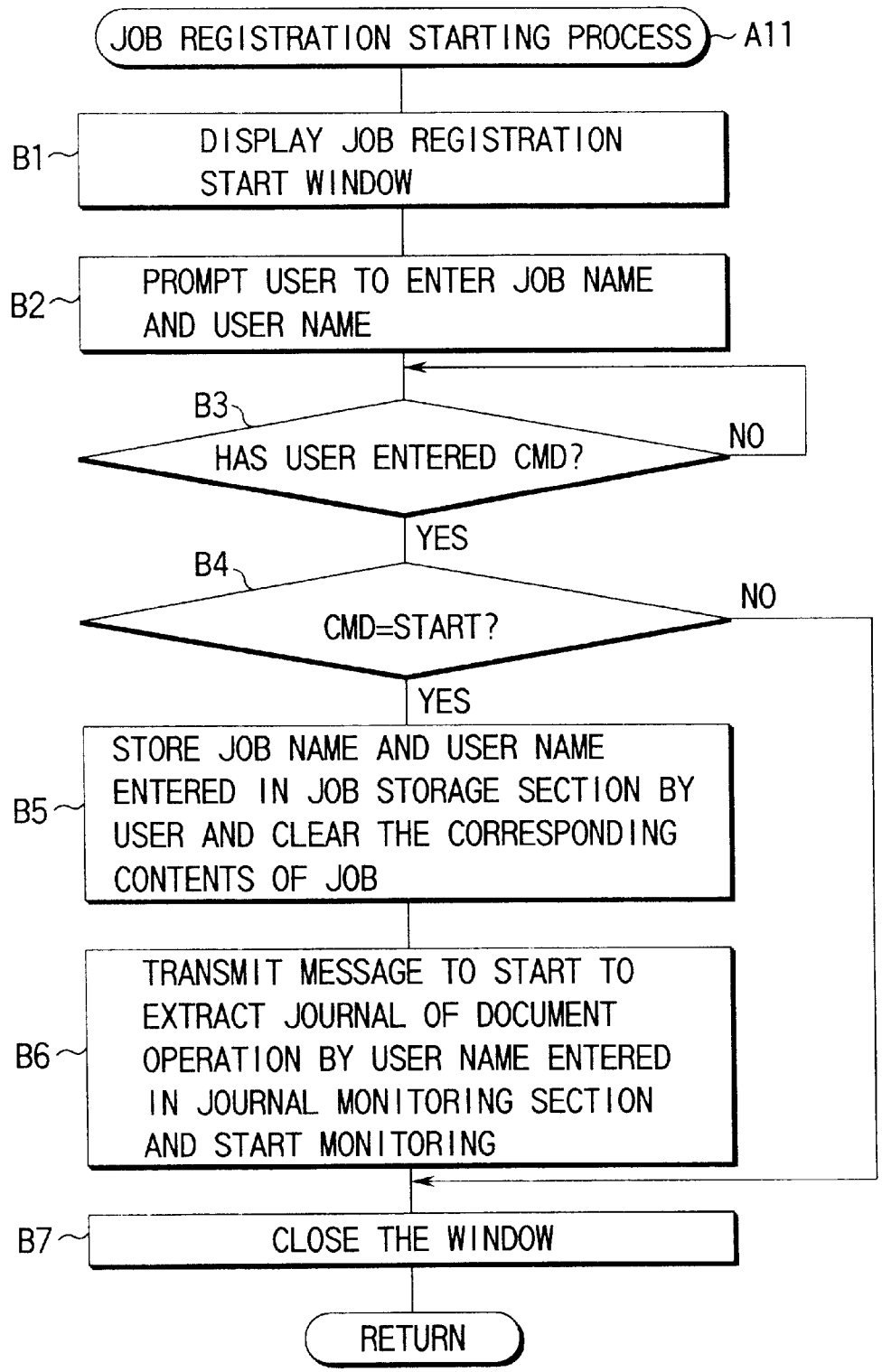
FIG. 9 is a flowchart of the procedure for the job management process executed when the job registration starting process is started in the job management tool process in the first embodiment.

FIG. 8 shows the job registration start window which appears when the job registration starting section 3h starts the job registration starting process in the job management tool process. FIG. 9 is a flowchart of the procedure for the job registration starting process.

In the job registration star ting process at the job registration starting section 3h, the job registration start window of FIG. 8 first appears (step B1 of FIG. 9).

On the job registration start window of FIG. 8, there are items into which the job name to be registered and the user name are supposed to be entered.

These items prompt the user to enter the name of a job to be registered and the user name. When the user enters the job name and the user name (step B2) and chooses "START" button (steps B3 and B4), the job registration starting process in accordance with the contents of the settings on the job registration start window is executed.

Specifically, in the example of the job registration start window of FIG. 8, "JOB NAME: CREATING REPORTS" and "USER NAME: LUCY" are entered (step B2 of FIG. 9).

When the user chooses START button (steps B3 and B4) on the job registration start window, the job name and user name the user h as entered (JOB NAME: CREATING REPORTS and USER NAME: LUCY) are stored in the job storage section 23. At this time, the contents of a job corresponding to the job are cleared and made empty (step B5).

Thereafter, a "START MONITORING (USER NAME)" message is sent to the journal monitoring section 3m using the user name entered by the user as a parameter. The message requests the monitoring section to start monitoring how the user operates on a document and record the monitoring result in the journal storage section 24 (step B6).

Thereafter, the window is closed and control is returned. When "CANCEL" button is chosen, the window will be simply closed and control be returned (step B7).

Figure 10:
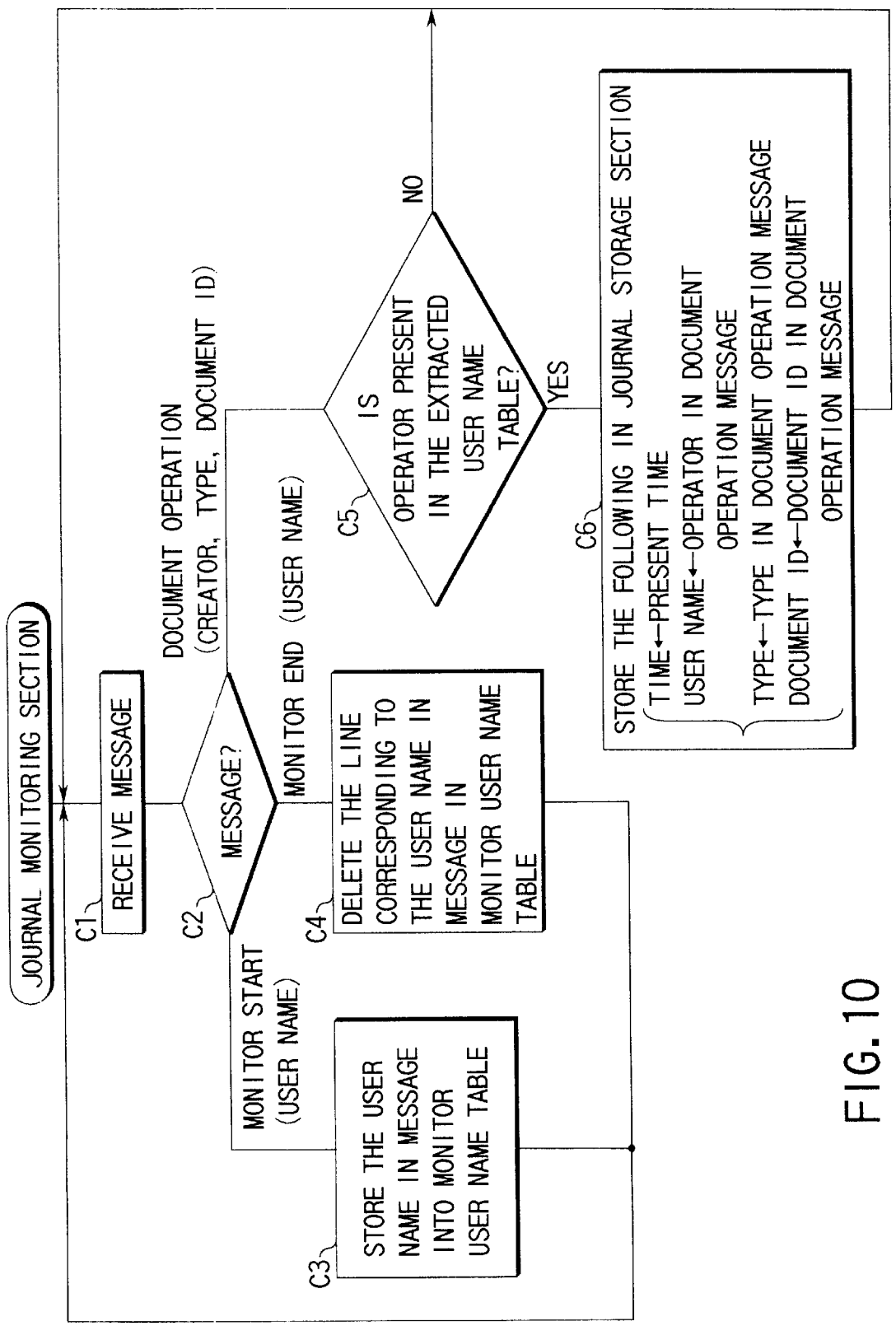
FIG. 10 is a flowchart of the procedure for the journal monitoring process executed at the journal monitoring section in the first embodiment.

FIG. 10 is a flowchart for the journal monitoring process at the journal monitoring section 3m.

In the journal monitoring process, messages from the other processing sections are received and the processes in accordance with the messages are performed.

In the journal monitoring process, when "START MONITORING (USER NAME)" has been received from the job registration starting section 3h (steps C1 and C2 of FIG. 10), the user name in the message is stored in the monitor user name table of FIG. 11 (step C3) and the journal monitoring section returns to the message reception state.

Thereafter, the journal monitoring section 3m stores, in the journal storage section 24, only the document operations related to the user name stored in the monitor user name table of FIG. 11.

When the user has operated a document, the operating system (OS) running in the server 20 transmits a document operation message to the journal monitoring section 3m. To do this, it is necessary to make settings beforehand so that the operating system may transmit the document operation message. Since the transmission of the document operation message can be realized on an existing operating system, explanation of how the document operation message is transmitted will not be given.

In the journal monitoring process, when "DOCUMENT OPERATION (OPERATOR, TYPE, and DOCUMENT ID)" has been received from the operating system (steps C1 and C2 of FIG. 10), a check is made to see if the operator name in the message has been stored in the monitor user name table (step C5). If it has been stored in the table, the following pieces of information will be recorded in the journal storage section 24 (step C6):

TIME←the present time

USER NAME←the operator name in the message

TYPE←the type in the message

DOCUMENT ID←the document ID in the message

When the operator name in the message has not been stored in the monitor user name table, control will return to the message reception process without storing the above data items in the journal storage section 24 (steps C5 and C1).

As shown in FIG. 8, when the job registration starting process is carried out with USER NAME: LUCY, how LUCY operates on a document is monitored from this time on and the monitoring result is stored in the journal storage section 24. As an example of the data structure, a journal of what LUCY did on MAY 13, 1997 is stored.

When an "END MONITORING (USER NAME)" message has been received fro m the job registration ending section 3j (steps C1 and C2 of FIG. 10) in the journal monitoring process, the line corresponding to the user name in the message is deleted from the monitor user name table and control is returned to the message reception (step C4). From this time on, the document operations by a user corresponding to the deleted user name will not be recorded.

Figure 13:
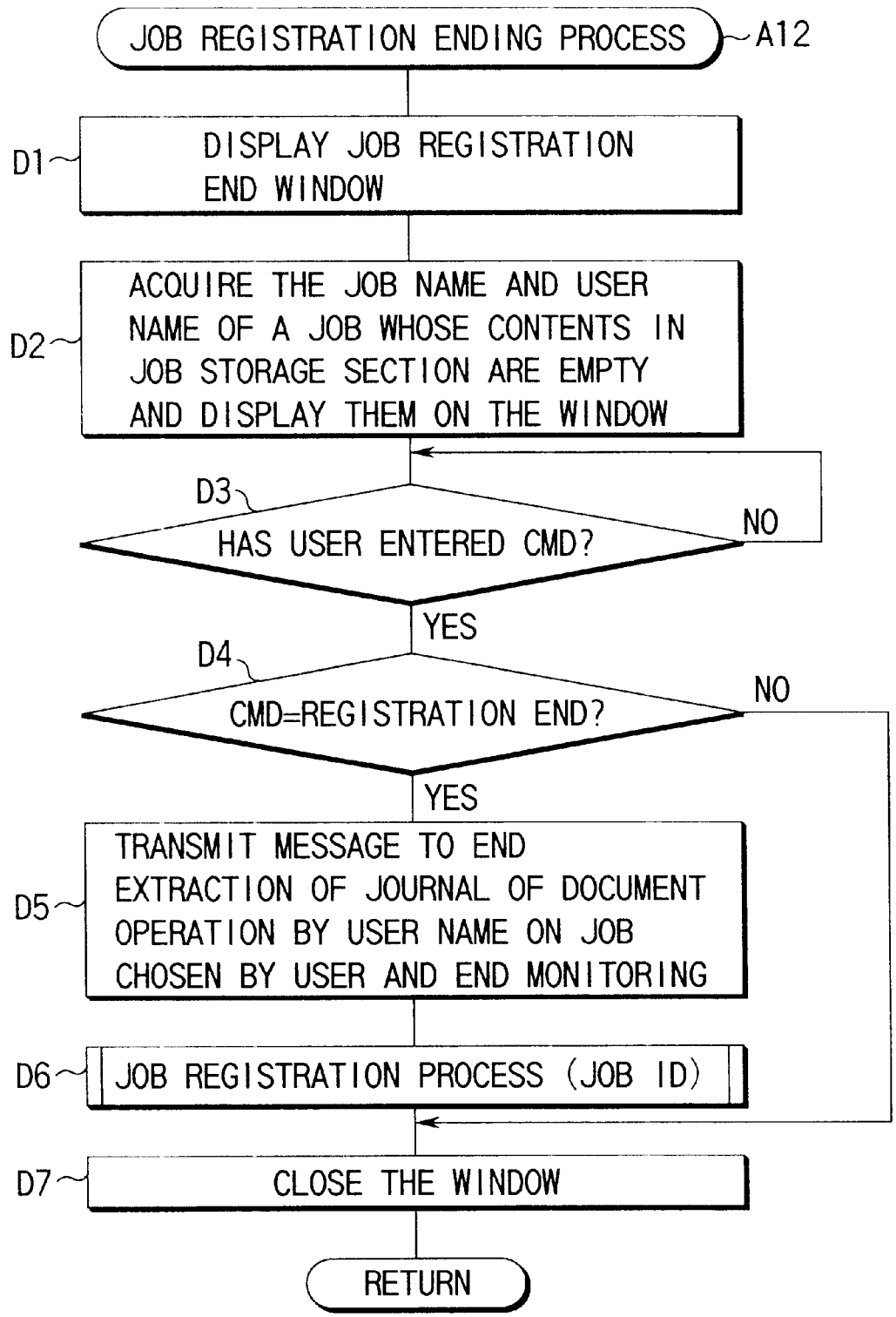
FIG. 13 is a flowchart of the procedure for the job registration ending process executed when the job registration ending process is started in the job management tool process in the first embodiment.

FIG. 12 shows the job registration end window which appears when the job registration ending process (step A12) is started in the job management tool process of FIG. 7. FIG. 13 is a flowchart for the job registration ending process executed at the job registration ending section 3j.

In the job registration ending process executed at the job registration ending section 3j, the job registration end window of FIG. 12 first appears (step D1 of FIG. 13). The job name corresponding to the job whose contents in the job storage section 23 are empty and the user name on the job are retrieved. The job list in the job registration end window is updated to reflect the retrieved data items (step D2).

The mark "□" appears to the left side of each line of the job list in the job registration end window. The user can choose one of the jobs by checking the mark.

In the job registration ending process, when the user has entered a CMD (step D3) and specifies the registration end button (step D4), "END MONITORING (USER NAME)" message is transmitted using the user name corresponding to the job chosen by the user as a parameter (step D5).

Thereafter, the job registration section 3d is called using the job ID corresponding to the job chosen by the user as a parameter. The job registration section is caused to record, into the contents of jobs in the job storage section 23, the document operations by a user corresponding to the user name in the journal storage section 24 (step D6). Thereafter, the job registration end window is closed and control is returned (step D7).

Figure 14:
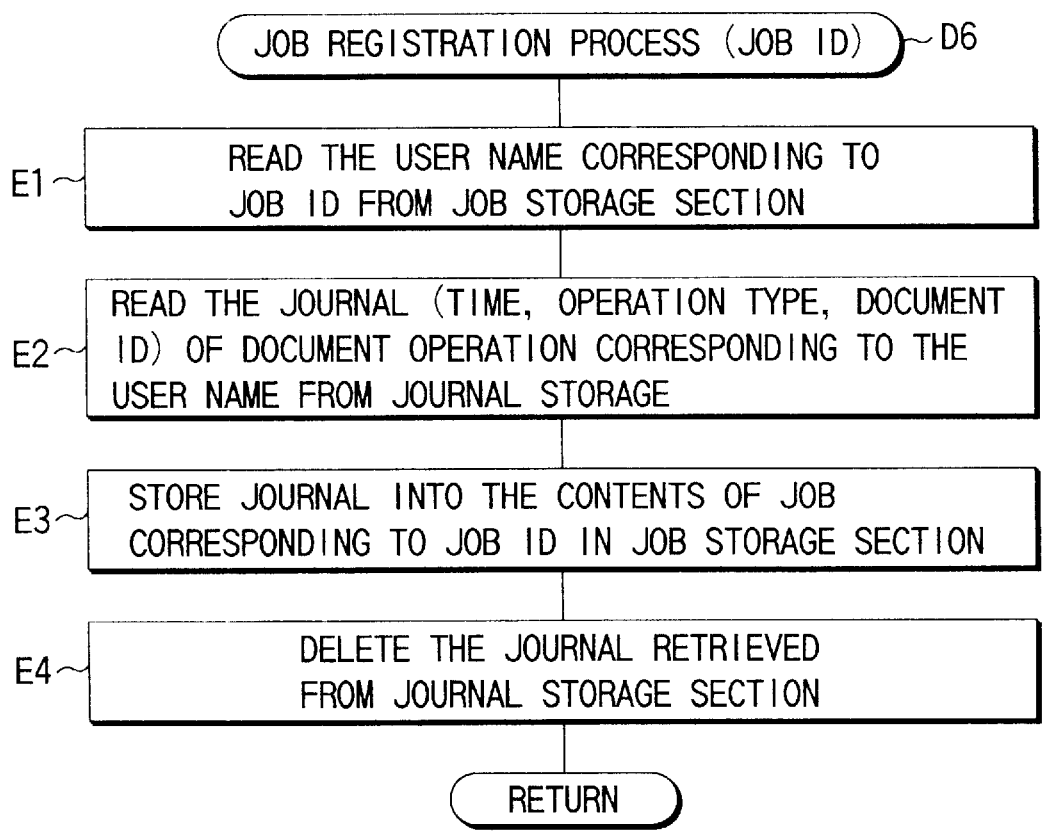
FIG. 14 is a flowchart of the procedure for the job registration process executed when the job registration process is started in the job registration ending process in the first embodiment.

FIG. 14 is a flowchart for the job registration process at the job registration section 3d.

In the job registration process at the job registration section 3d, the corresponding user name is retrieved from the job storage section using the job ID given in the parameter (step E1). The journal of document operations by the user is read from the journal storage section 24 (step E2) and recorded in the contents of jobs corresponding to the job ID in the job storage section (step E3). Thereafter, the journal of document operations is deleted from the journal storage section 24 and control is returned (step E4).

FIG. 15 shows an example of the journal of document operations by LUCY or JACK in the journal storage section 24 of FIG. 5 having been recorded in the contents of jobs in the job storage section 23 in the job registration process.

As described above, when the user specifies only the job registration start and job registration end, this causes the document operations during that period of time to be recorded in the contents of jobs automatically. As a result, the efficiency of registering a job is improved remarkably.

Hereinafter, the retrieval and editing of a registered job will be explained.

Figure 18:
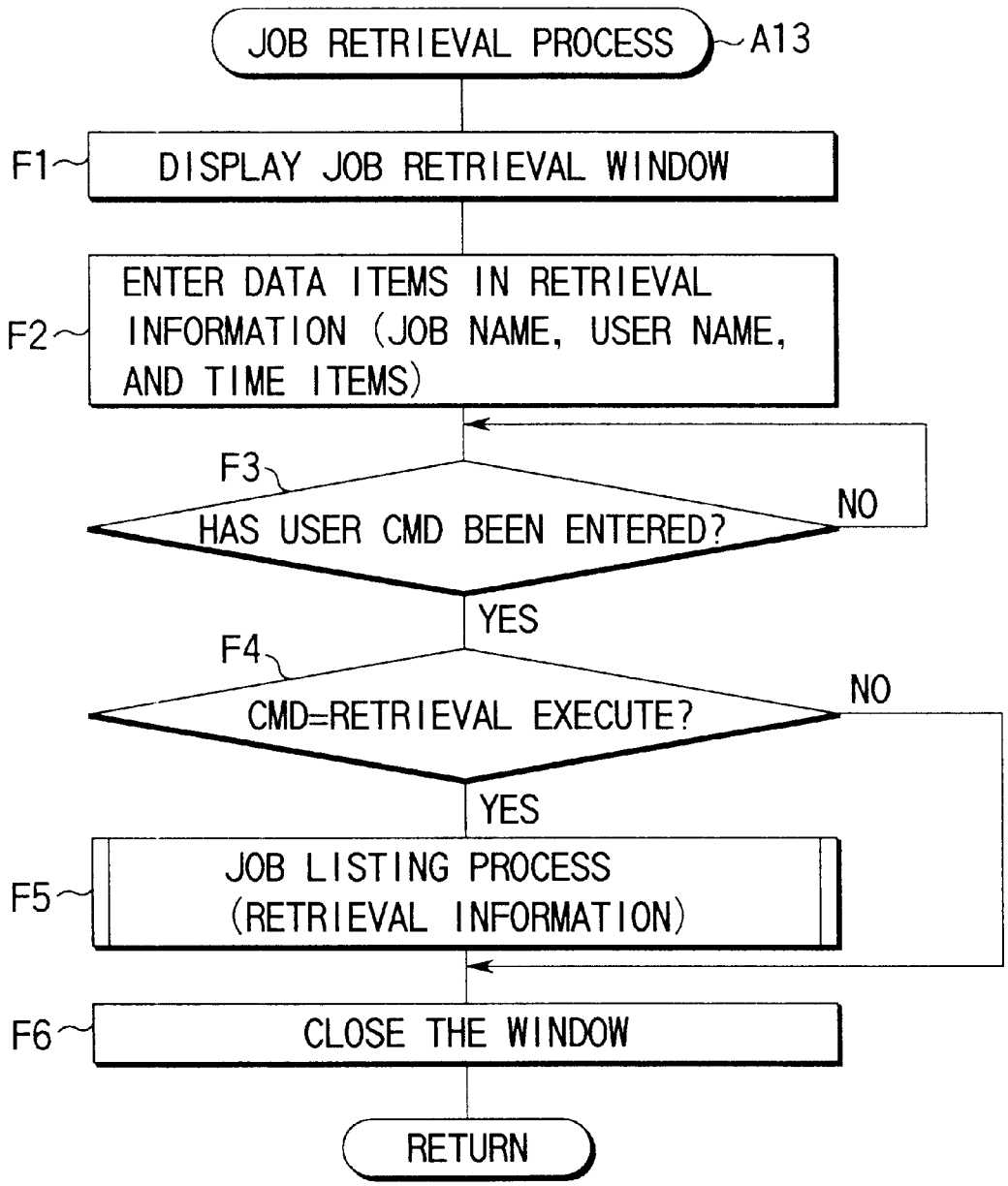
FIG. 18 is a flowchart of the procedure for the job retrieval process executed when the job retrieval process is started in the job management tool process in each of the first and second embodiments.

FIG. 16 shows the job retrieval window which appears when the job retrieval section 3e starts the job retrieval process (step A13 of FIG. 7) in the job management tool process of FIG. 7. FIG. 18 is a flowchart of the procedure for the job retrieval process.

In the job retrieval process at the job retrieval section 3e, the job retrieval window of FIG. 16 first appears (step F1 of FIG. 18).

On the job retrieval window of FIG. 16, there is a region in which pieces of information for retrieving a job are to be entered. When the user enters the necessary pieces of information there (step F2) and specifies the "RETRIEVE JOBS" button located at the bottom of the window (steps F3 and F4), the job list process of retrieving jobs and listing the related jobs is started (step F5). Thereafter, the window is closed (step F6).

Here, the pieces of information for retrieving jobs are made up of "JOB NAME", "USER NAME", and "JOB DURATION TIME" during which the user did the job. As an initial value, "*" indicating that nothing has been specified appears.

In the example of the job retrieval window of FIG. 16, "LUCY" has been entered in "USER NAME". In this state, when the user specifies the "RETRIEVE JOBS" button, the jobs LUCY did are retrieved and the job listing process of displaying a list of the related jobs is started (step F5 of FIG. 18). At that time, the aforementioned retrieval information is given to the job listing process as parameters.

Figure 19:
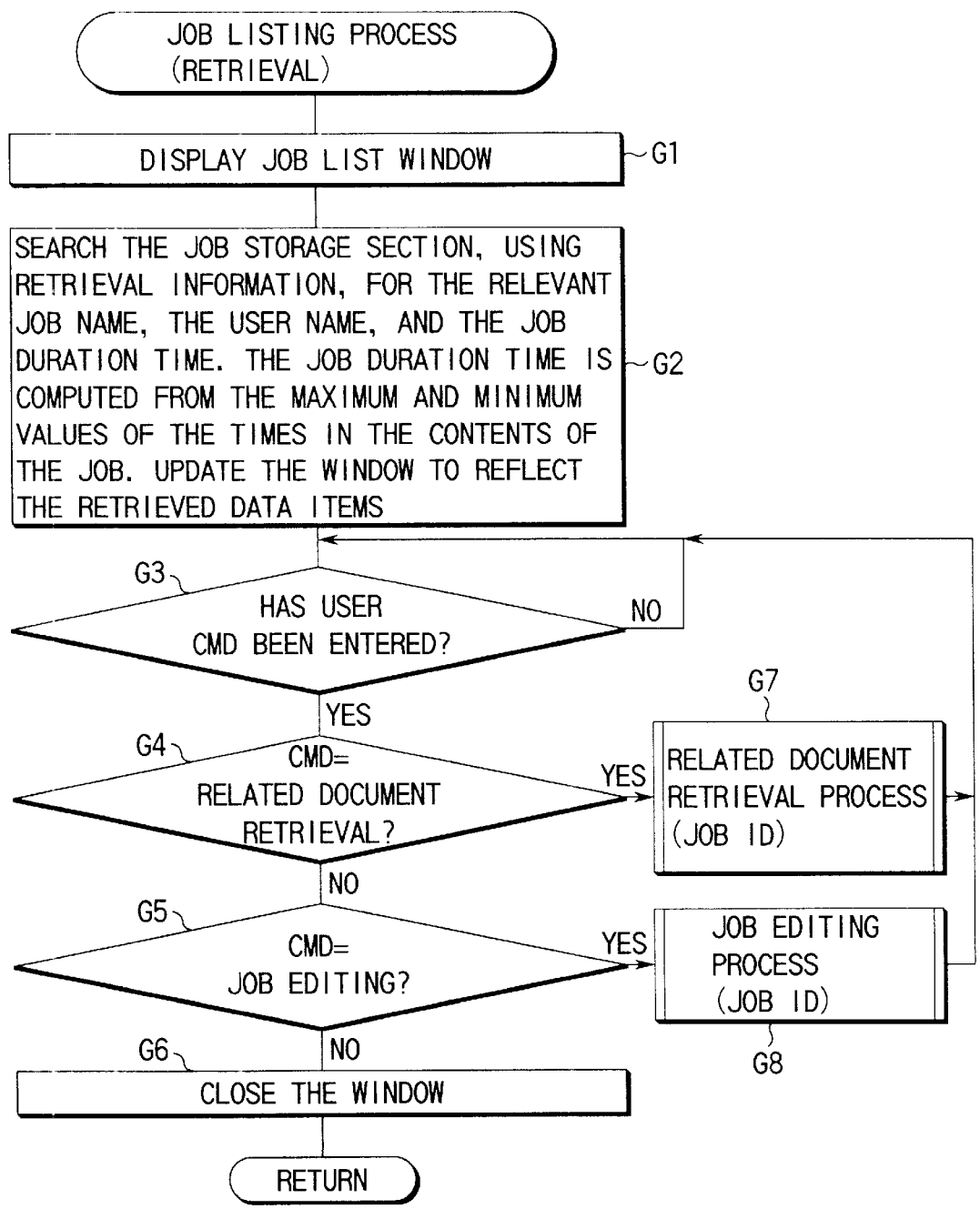
FIG. 19 is a flowchart of the procedure for the job listing process executed when the job listing process is started in the job registration process in each of the first and second embodiments.

FIG. 17 shows the job list window which appears when the job listing process (step F5) is started in the job retrieval process of FIG. 18. FIG. 19 is a flowchart for the job listing process.

In the job listing process of FIG. 19, the job list window first appears (step G1 of FIG. 19). Using the retrieval information (JOB NAME, USER NAME, and JOB DURATION TIME) entered from the job retrieval window, the job storage section is searched for the relevant pieces of job information. The window is updated to reflect the retrieved data items (step G2). The job duration time is calculated from the max minimum and minimum values of the times in the contents of the job.

In the example of FIG. 17, the job (JOB NAME: ORGANIZING CATALOGS) whose USER NAME is LUCY appears. The mark "□" appears to the left side of each job in the list. The user can choose one of the jobs by checking the mark with a mouse.

When the user specifies the "RETRIEVE RELATED DOCUMENT" button located at the bottom of the window (steps G3 and G4), the related document retrieval process of displaying the related documents for the job chosen by a check is started (step G7). Here, the job ID for the chosen job is given to the related document retrieval process as a parameter.

Figure 21:
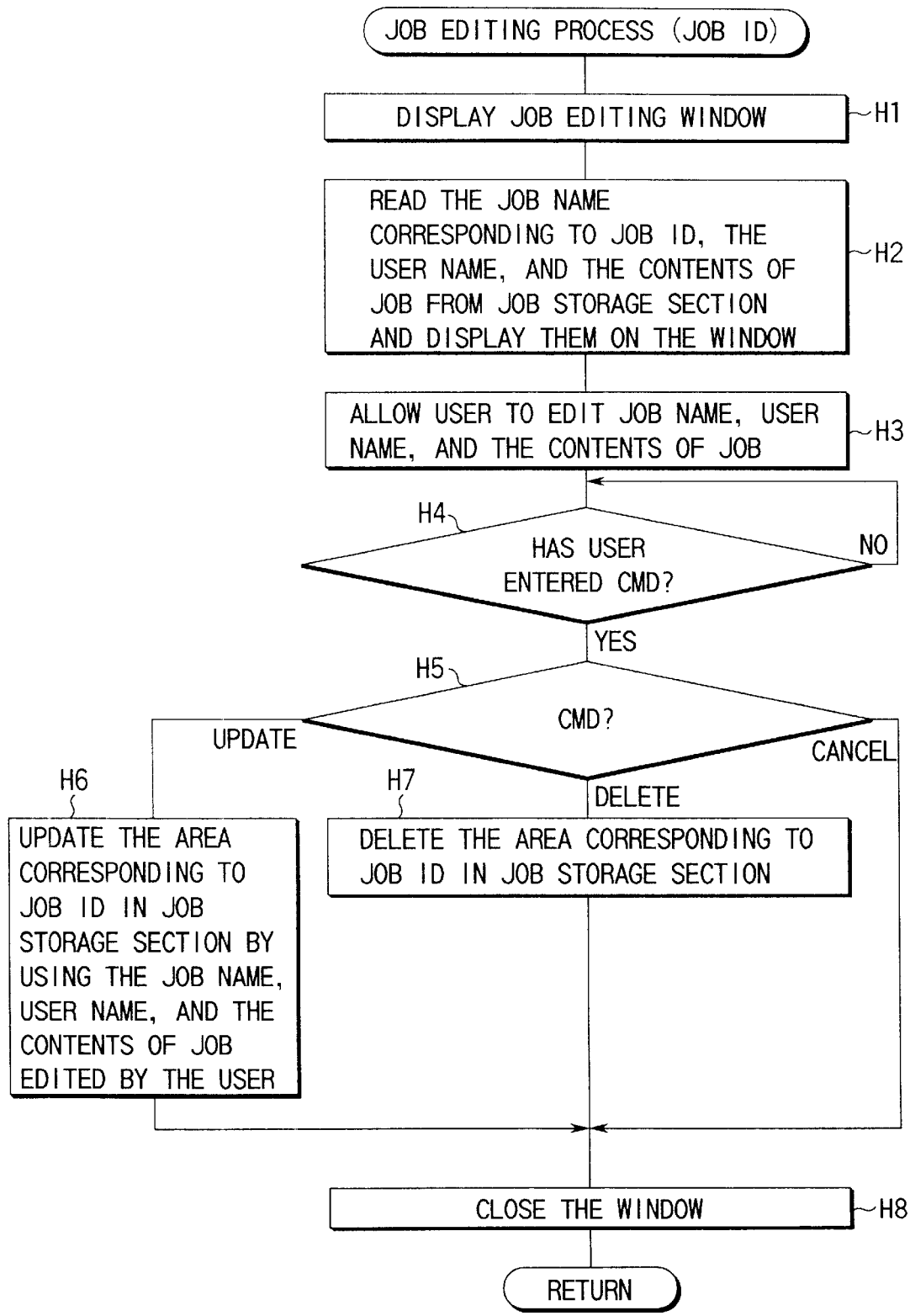
FIG. 21 is a flowchart of the procedure for the job editing process executed when the job editing process is started in the job listing process in each of the first and second embodiments.

FIG. 20 shows the job editing window which appears when the job editing process (step G8) is started in the job listing process of FIG. 19. FIG. 21 is a flowchart of the procedure for the job editing process.

In the job editing process, the job editing window of FIG. 20 first appears (step H1 of FIG. 21). The job name corresponding to the job ID given as a parameter from the job storage section 23, the user name on the job, and the contents of the job are retrieved. The window is updated to reflect the retrieved data items (step H2).

When the user has edited the job name, the user name, and the contents of the job (step H3) and then pressed the "UPDATE" button (steps H4 and H5), the edited contents are stored in the job storage section (step H6).

When the "DELETE" button is pressed on the job editing window, the job corresponding to the job ID is deleted from the job storage section 23 (step H7). Thereafter, the window is closed (step H8) and control is returned.

The job editing process makes it possible to change the name of a registered job or to delete the unnecessary document operations in the contents of jobs or conversely to add the document operations to the contents of jobs.

Figure 23:
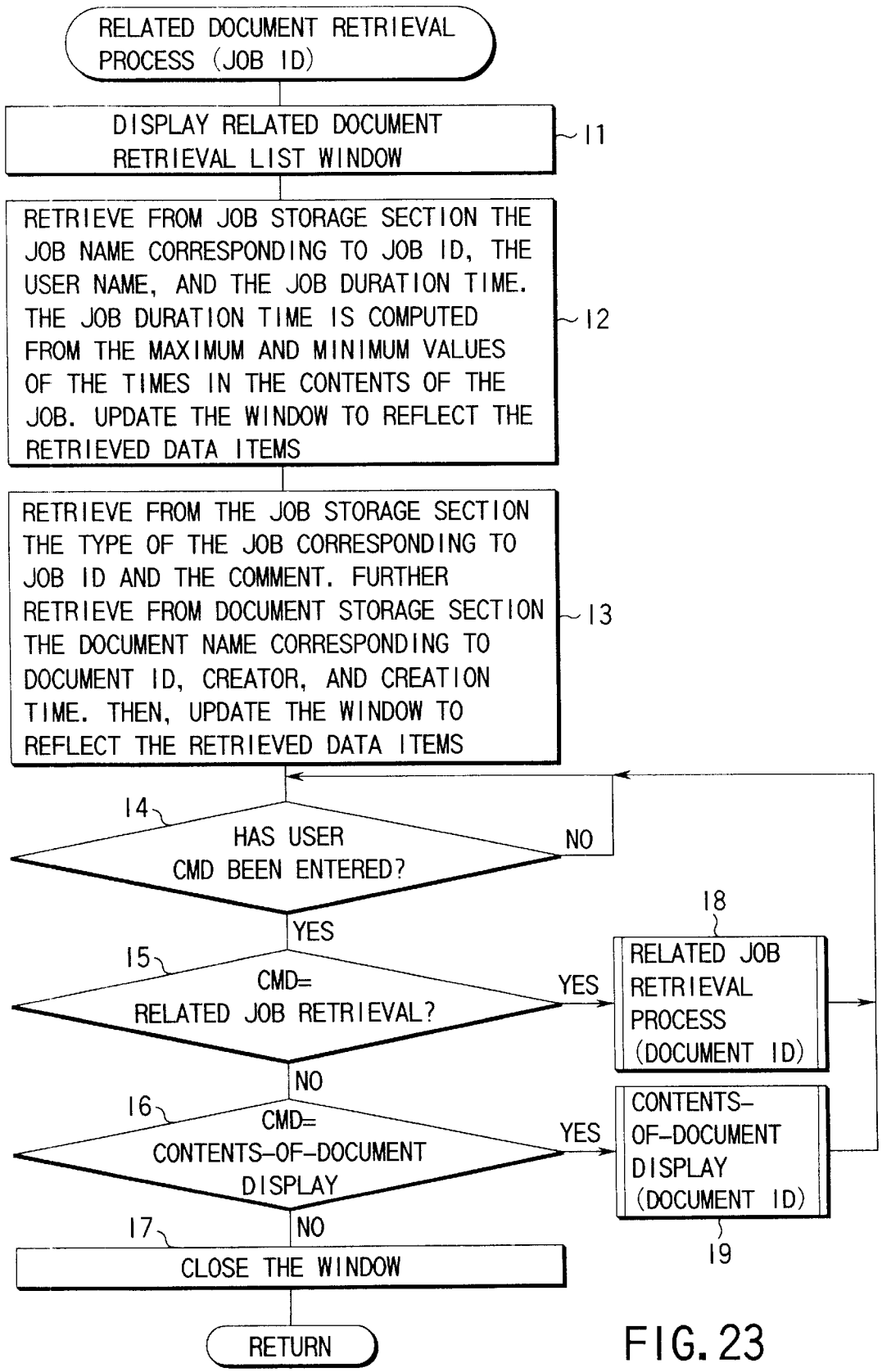
FIG. 23 is a flowchart of the procedure for the related document retrieval process executed when the related document retrieval process is started in the job listing process in each of the first and second embodiments.

FIG. 22 shows the related document retrieval list window which appears when the related document retrieval process (step G7) is started in the job listing process of FIG. 19. FIG. 23 is a flowchart for the related document retrieval process.

In the related document retrieval process of FIG. 23, the related document retrieval list window first appears (step I1 of FIG. 23). The job name corresponding to the job ID given in the parameter, the user name, and the job duration time are retrieved from the job storage section 23. The job duration time is calculated from the maximum and minimum values of the times in the contents of the job. The window is updated to reflect the retrieved data items (step I2).

Then, the type and the comment corresponding to each document in the contents of the job corresponding to the job ID are retrieved from the job storage section 23. The window is forced to reflect the retrieved data items. Moreover, the document name, document creator, and creation time corresponding to the document ID are retrieved from the document storage section 22. The window is again updated to reflect these retrieved data items (step I3).

In the example of FIG. 22, "JOB NAME: ORGANIZING CATALOGS", "USER NAME: LUCY", and "JOB DURATION TIME: 10:00, MAY 12, 1997 TO 11:00, MAY 12, 1997" are displayed. For the related documents, "DOCUMENT NAME: CATALOG" and "DOCUMENT NAME: MEMO 1" are displayed.

From this time on, users can search and retrieve documents which LUCY referred to and created while executing her job of organizing catalogs.

The mark "□" appears to the left side of each document in the list. The user can choose one of the documents by checking the mark. When the user specifies the "DISPLAY DOCUMENT CONTENTS" button located at the bottom of the window (steps I4 and I6), the contents of the chosen document are displayed (step I9).

When the "DISPLAY DOCUMENT CONTENTS" button is specified, the contents of the document are read from the document storage section 22 on the basis of the ID for the chosen document. The contents are then displayed on the screen.

When the "RETRIEVE RELATED JOBS" button (steps I4 and I5) is specified, the related job retrieval process is started using the ID for the chosen document as a parameter (step I8).

Figure 25:
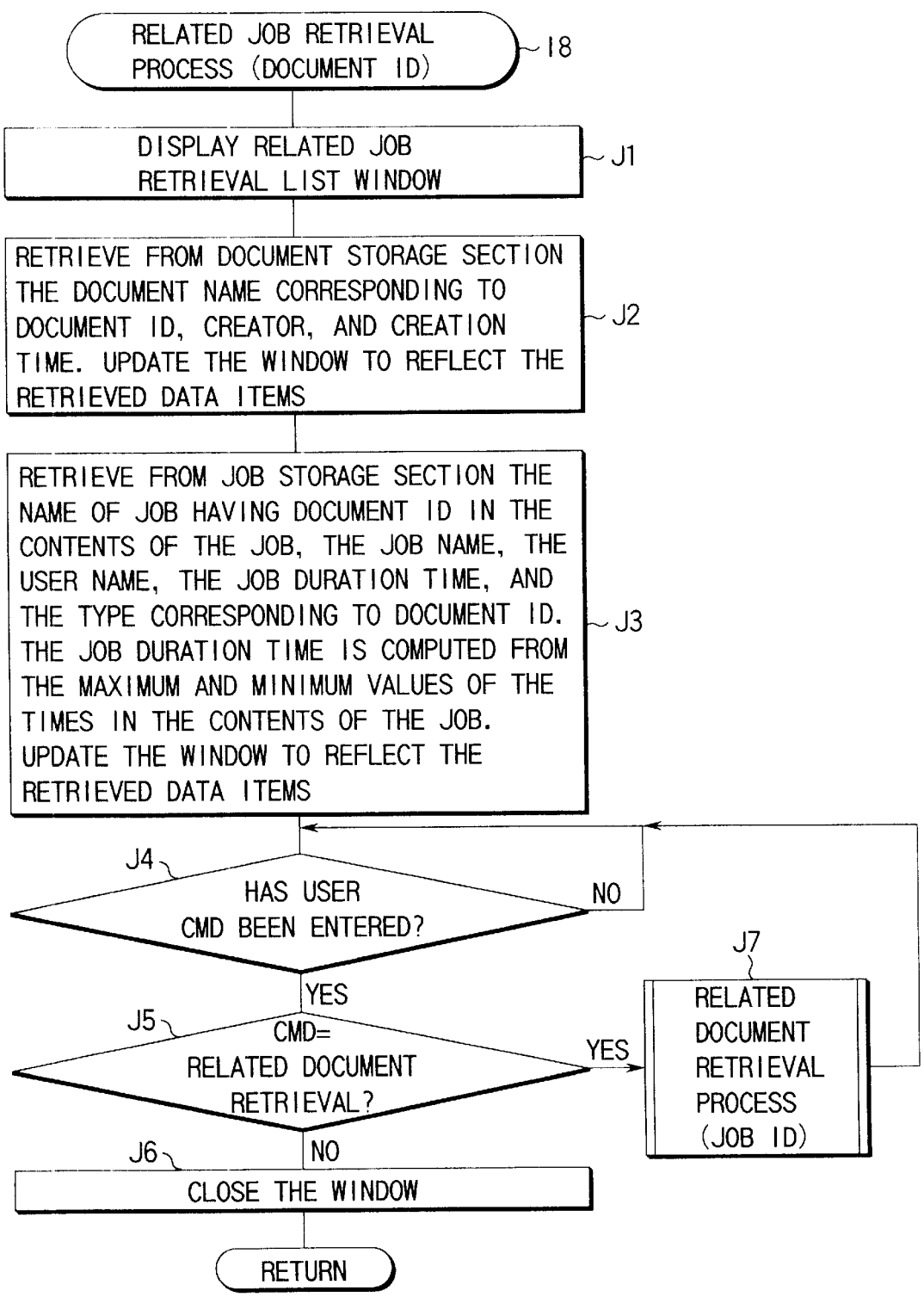
FIG. 25 is a flowchart of the procedure for the related job retrieval process executed when the related job retrieval process is started in the related document process in each of the first and second embodiments.

FIG. 24 shows the related job retrieval list window which appears when the related job retrieval process is started in the related document retrieval process. FIG. 25 is a flowchart for the related job retrieval process.

In the related job retrieval process, the related job list window of FIG. 24 first appears (step J1 of FIG. 25). The document name, document creator, and creation time corresponding to the document ID given in the parameter are retrieved from the document storage section 22. The window is updated to reflect these retrieved data items (step J2).

Then, the job that has the document ID in its contents is retrieved from the job storage section 23. The job name, the user name, the job duration time, and the operation type corresponding to the document ID in the contents of the job are retrieved from the job storage section for each of the related jobs. The window is again updated to reflect these retrieved data items (step J3).

In the example of the related job retrieval list window of FIG. 24, "DOCUMENT NAME: CATALOG", "CREATOR: TONY", and "CREATION TIME: 11:00, MAY 11, 1997" are displayed. For the related jobs, "JOB NAME: ORGANIZING CATALOGS" done by LUCY and "JOB NAME: REVISING MEMO" done by JACK are displayed.

From this time on, users can search and retrieve jobs that are related to the document "DOCUMENT NAME: CATALOG", namely jobs of organizing catalogs and a revising memo.

The user can start the related document retrieval process of FIG. 23 by choosing one of the jobs displayed on the window (steps J4, J5, and J7).

Figures 26, 27:
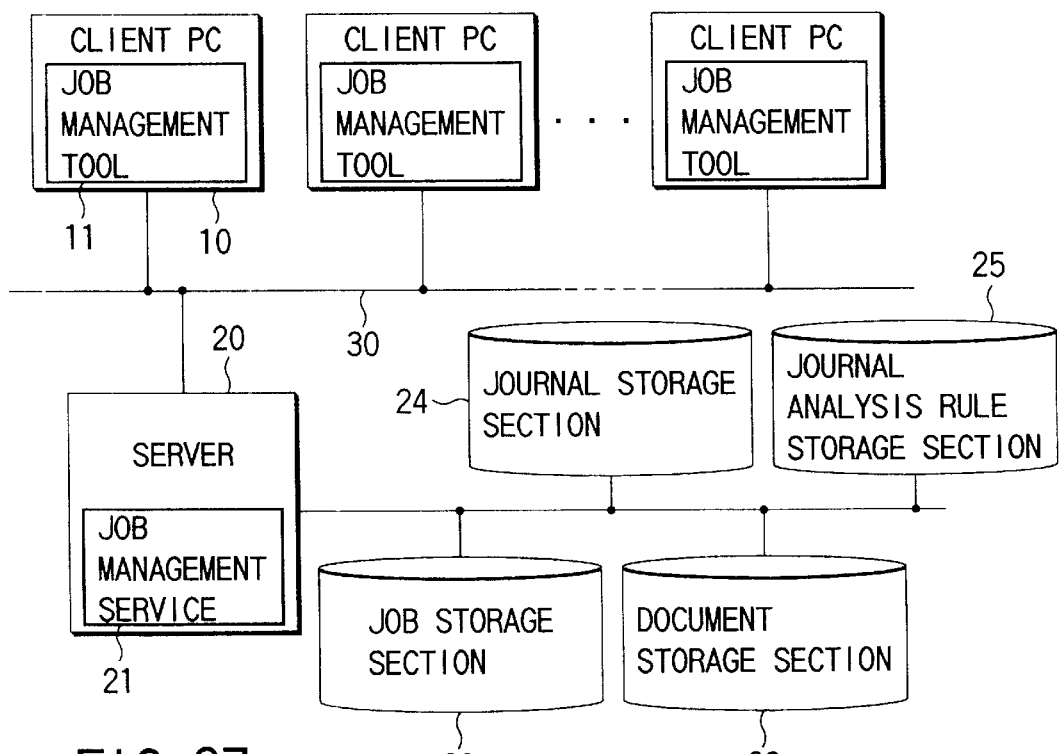
FIG. 26 illustrates an example of the related document retrieval list window displayed when the related document retrieval process is started in each of the first and second embodiments.
FIG. 27 is a block diagram of the overall system configuration of a second embodiment according to the present invention.

An example of the related document retrieval list window at that time is shown in FIG. 26. In the example of the related document retrieval list window of FIG. 26, the jobs related to "JOB NAME: REVISING MEMO" made by JACK are displayed.

As described above, with the apparatus according to the embodiment, it is possible to retrieve the related catalogs created by TONY, starting with the catalog-organizing job done by LUCY. Furthermore, on the basis of the TONY'S catalog document, users can retrieve the memo-revising job done by TONY, and then retrieve the memo revision document created by JACK. From the viewpoint of jobs, it is possible to correlate documents with each other and retrieve documents in various directions.

Because the user has only to specify the job registration start and job registration end to record the document operations during that period of time into the contents of jobs automatically, the efficiency of registering a job is improved remarkably.

As described above, by storing the document used in a job together with the job name and user name on the job and providing a related document retrieval function, the related document can be retrieved from the user name on the job or the job name, which enables the necessary document to be retrieved efficiently.

Furthermore, by storing the document used in a job together with the job name and user name on the job and providing a related job retrieval function, the contents of the related job can be retrieved from the document name or the document creator, which enables the necessary document to be retrieved efficiently.

Still furthermore, by storing the document used in a job together with the job name and user on the job and providing a related document retrieval function and a related job retrieval section, not only the related document can be retrieved from the user on the job or the job name, but also the contents of the related job can be retrieved from the document name or the document creator.

Still furthermore, by adding the function of registering jobs on the basis of the journal of document operations by a user, the necessary documents can be retrieved efficiently and quickly without imposing on the user the burden of registering jobs.

[Second Embodiment]

In a second embodiment of the present invention, the same component parts as those in the first embodiment are indicated by the same reference symbols and a concrete explanation of them will not be given.

FIG. 27 is a block diagram of the overall system configuration of a second embodiment of the present invention.

A client PC 10, a job management tool 11, a server 20, a job management service module 21, a document storage section 22, a job storage section 23, and a journal storage section 24 are the same in configuration as those in the first embodiment.

Numeral 25 indicates a journal analysis rule storage section that stores a monitor rule for monitoring the document operations and a registration rule for analyzing the delimiter of a job on the basis of the recorded journal. The monitor rule is referred to by a journal monitoring section 3$m$ explained layer. The registration rule is referred to by a journal analysis section 3$q$ explained later.

Figure 28:
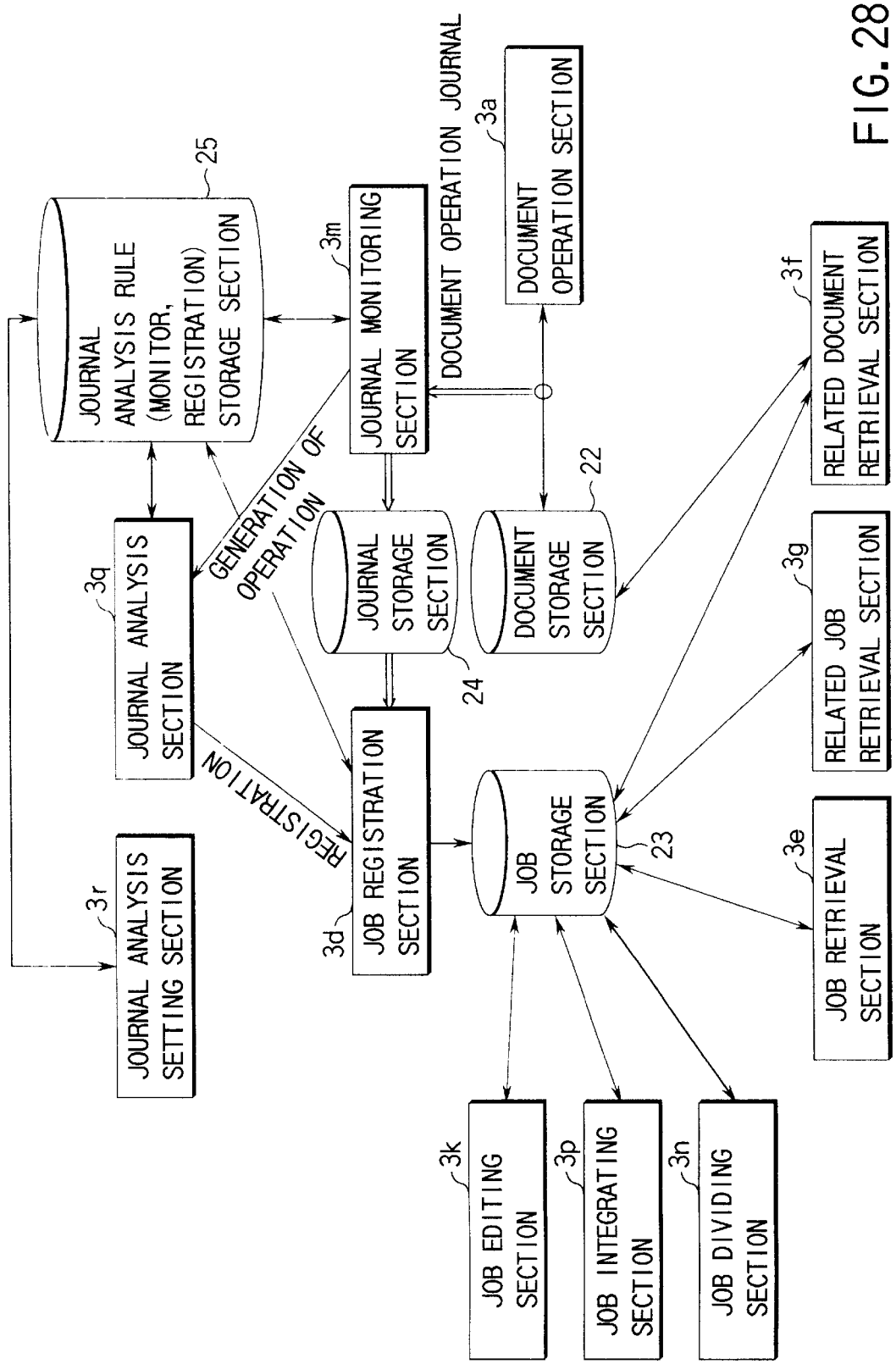
FIG. 28 is a block diagram of the main sections of the second embodiment.

FIG. 28 is a block diagram of the main sections in the second embodiment.

In FIG. 28, numerals 22 to 25 indicate the storage sections shown in FIG. 27. Numeral 22 represents the document storage section, 23 the job storage section, 24 the journal storage section, and 25 the journal analysis rule storage section. Reference symbols 3$a$, 3$d$, . . . , 3$r$ indicate processing sections with special processing functions. The specific processing functions are realized by the job management tool 11 provided for the client PC 10 or the job management service module 21 provided for the server 20.

Of the processing sections, 3$a$ indicates a document operation section for retrieving or registering a document, which is to be operated by the user. How the user operated on a document is monitored for a journal of document operations by the journal monitoring section 3$m$ explained later.

Reference symbol 3$m$ indicates a journal monitoring section for monitoring how the user has operated on a document and recording the monitoring result in the journal storage section 24 in accordance with the monitor rule stored in the journal analysis rule storage section 25. The journal monitoring section monitors the document operation at the document operation section 3$a$ and records the contents of the document operations into the journal storage section 24.

Reference symbol 3$r$ indicates a journal analysis setting section that sets a monitor rule for monitoring document operations and a registration rule for analyzing the delimiter of a job on the basis of the recorded journal and records the settings in the journal analysis rule storage section 25.

Reference symbol 3$q$ indicates a journal analysis section for analyzing the journal stored in the journal storage section 24 in accordance with the registration rule stored in the journal analysis rule storage section 25 and extracting the delimiter of a job.

Reference symbol 3d represents a job registration section for registering the contents of jobs in the job storage section 23 on the basis of the journal of document operations in the journal storage section 24.

Reference symbol 3e indicates a job retrieval section for retrieving a job on the basis of the job name or the user on the job. A related document retrieval section 3f retrieves the related document referred to or created in a job. A related job retrieval section 3g for retrieving from a document the related jobs that have referred to or created the document.

Reference symbol 3k represents a job editing section for editing the job names, the user names, and the contents of jobs in the job storage section 23. A job integration section 3p integrates a plurality of jobs in the job storage section 23 into one job. A job division section 3n divides one job in the job storage section 23 into a plurality of jobs.

Each of the above sections is executed by the CPU of the client PC 10 or that of the server 20. The interaction with the user is realized by a display and a keyboard or a mouse (not shown) provided for the personal computer (PC). The storage sections provided for the server 20 are formed in a hard disk (HD) (not shown). Alternatively, they may be formed on, for example, other storage devices connected to the network. Since the document operation section 3a has the same configuration as in the first embodiment, its explanation will not be given.

The processing function shown in each of the flowcharts explained later can be realized by a storage medium, such as a magnetic disk, having program code instructions stored thereon which performs the above processing when executed by a processor in a computer. That is, the processing function in each flowchart can be realized by the client PC 10 or the server 20.

The operation of the second embodiment will be explained by reference to each of the above drawings.

As shown in FIG. 3 (as in the first embodiment), the document storage section 22 stores, as one unit of document, a document ID acting as an identifier specifying a document uniquely, the name of the document, the name of the creator who has created the document, the creation time, and the address for the body of the document or the contents of the document in such a manner that they are associated with each other.

As shown in FIG. 4 (as in the first embodiment), the job storage section 23 stores, as one unit of job, a job ID acting as an identifier specifying a job uniquely, the job name, the user name on the job, and the contents of the job in such a manner that they are associated with each other.

The related document ID, the operation type indicating whether the document has been referred to or created, the time when the user operated the document, and a comment the user can set freely are stored as the contents of the job.

Furthermore, as shown in FIG. 5 (as in the first embodiment), the journal storage section 24 stores, as one unit of a journal, the time when the document was operated on, the user name who operated the document, and the document ID in such a manner that they are associated with each other. The operation type includes the creation of a document, reference to a document, and logout.

Figures 29, 30:
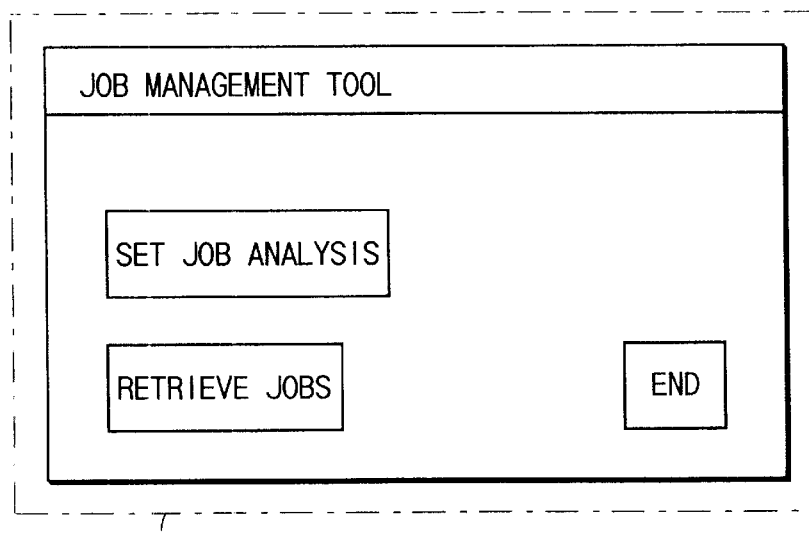
FIG. 29 shows an example of the data structure used in the journal analysis rule storage section of the second embodiment.
FIG. 30 illustrates an example of the job management tool window displayed at the time of system start-up in the second embodiment.

As shown in FIG. 29, the journal analysis rule storage section 25 further stores, on a user name basis, a monitor rule for monitoring a journal of document operations and a registration rule for determining the delimiter of a job and the job name on the basis of the journal of document operations.

The monitor rule is referred to by the journal monitoring section 3m and consists of the monitoring the job duration time, the operation type, and the name of a document to be operated on. When the rule is marked with the symbol "*", this means that all document operations are to be monitored and stored in the journal storage section 24.

In an example of the LUCY's monitor rule, the rule means that all document operations are to be monitored during all the periods of time for the operation type concerning the creation of and reference to a document.

On the other hand, in an example of the JACK's monitor rule, the rule means that all document operations are to be monitored during the period of time in the afternoon for the operation type concerning reference to a document and logout.

The registration rule is referred to by the journal analysis section 3q and consists of a delimiter rule for extracting the delimiter of a job from the journal stored in the journal storage section 24 and a job name rule for determining the job name from the delimited job.

The job registration section registers, as one job in the job storage section 23, a journal related to one user name before the journal acting as a delimiter. In the example of the LUCY's registration rule, the rule has been stored that the time at which a document has been created should be determined to be the delimiter of a job and the name of the created document be determined to be the job name. In the example of the JACK's registration rule, the rule has been stored that the time at which logging-out has been done should be determined to be the delimiter of a job and the fixed name "CHECKING JOB" be determined to be the job name.

An example of document operations by use of the apparatus of the second embodiment will be described using the windows displayed on the display and the flowcharts.

An example of the window layout of the job management tool 11 displayed at the time of system start-up is shown in FIG. 30.

On the window, the buttons for "SET JOB ANALYSIS", "RETRIEVE JOBS", and "END" are arranged. One of them can be chosen by operating the keyboard or mouse to start the process corresponding to the chosen button.

Figure 31:
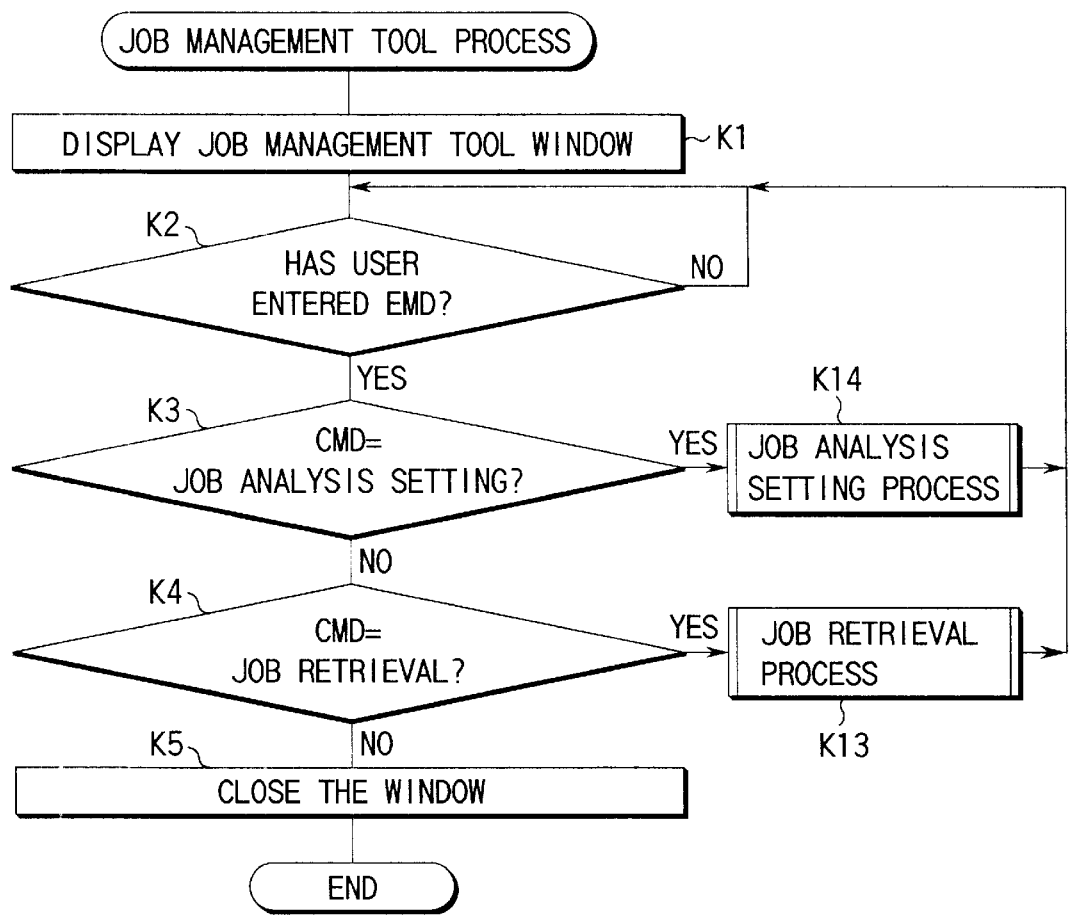
FIG. 31 is a flowchart of the procedure for the job management tool process in the second embodiment.

The flowchart of FIG. 31 shows the procedure performed by the job management tool 11.

In the job management tool process, the job management window of FIG. 30 first appear (step K1 of FIG. 31) and the process waits for the user to enter a command (CMD) (step K2). In accordance with the inputted command (CMD) (steps K3 and K4), the job analysis setting process is started (step K14), the job retrieval process is started (step K13), or the window is closed to end the process (step K5).

Figure 33:
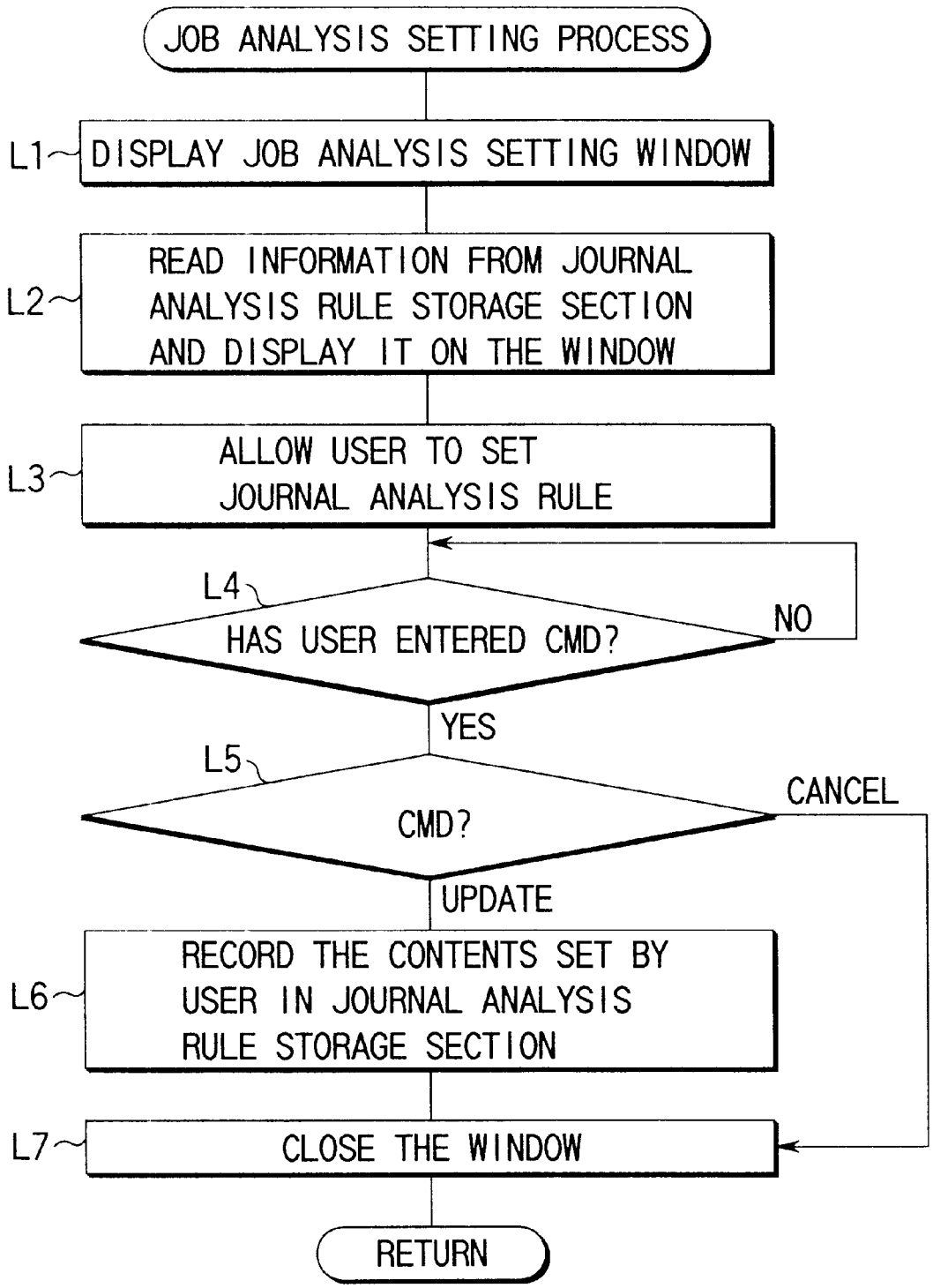
FIG. 33 is a flowchart of the procedure for the job management process executed when the job analysis setting process is started in the job management tool of the second embodiment.

FIG. 32 shows the job analysis setting window which appears when the job analysis setting section process (step K14) is started in the job management tool process of FIG. 31. FIG. 33 is a flowchart of the procedure for the job analysis setting process.

In the job analysis setting process, the job management window of FIG. 32 first appears (step L1 of FIG. 33).

On the job analysis setting window of FIG. 32, the contents stored in the journal analysis rule storage section 25 are displayed (step L2). The user can set the contents by creation, modification, or deletion (step L3). When the user specifies the UPDATE button after setting the contents (steps L4 and L5), the contents set by the user are recorded in the journal analysis rule storage section 25 (step L6).

In an example of the window in FIG. 32, the same contents of the data structure in the journal analysis rule storage of FIG. 29 are shown.

When the user has operated on a document, the operating system (OS) calls the journal monitoring section 3m using the contents of the document operations as a parameter. The document operation at that time is made up of "TIME", "USER NAME", "OPERATION TYPE", and "DOCUMENT ID".

To call the journal monitoring section 3m, it is necessary to set parameters in the operating system beforehand so that the operating system may call the journal monitoring section when the user operates a document. Since such setting can be done on an existing operating system, explanation of the setting will not be given.

Figure 34:
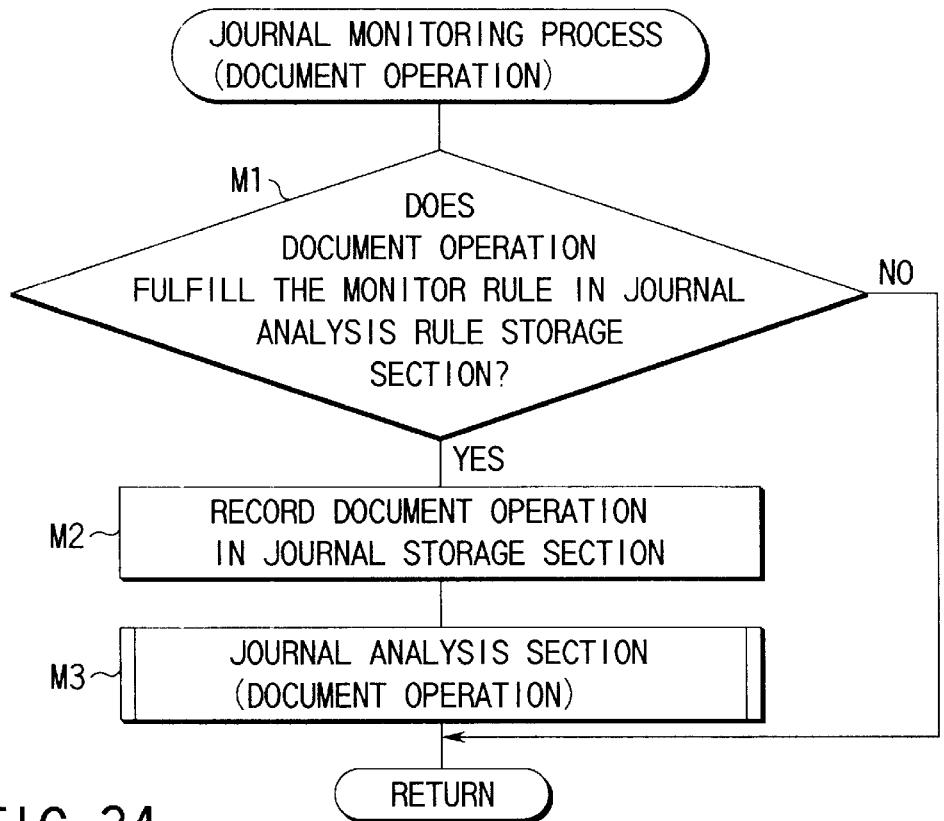
FIG. 34 is a flowchart of the procedure for the journal monitoring process executed at the journal monitoring section of the second embodiment.

FIG. 34 is a flowchart for the journal monitoring process at the journal monitoring section 3m.

In the journal monitoring process, a judgment is made whether or not the contents of the document operation given in a parameter fulfill the monitor rule for the corresponding user name in the journal analysis rule storage section 25 (step M1 of FIG. 34). If the contents fulfill the rule, the contents of the document operation will be recorded in the journal storage section 24 (step M2). The journal analysis section 3q is called using the document operation as a parameter (step M3). Thereafter, control is returned. If the contents do not fulfill the monitor rule, control will be just returned.

Figure 35:
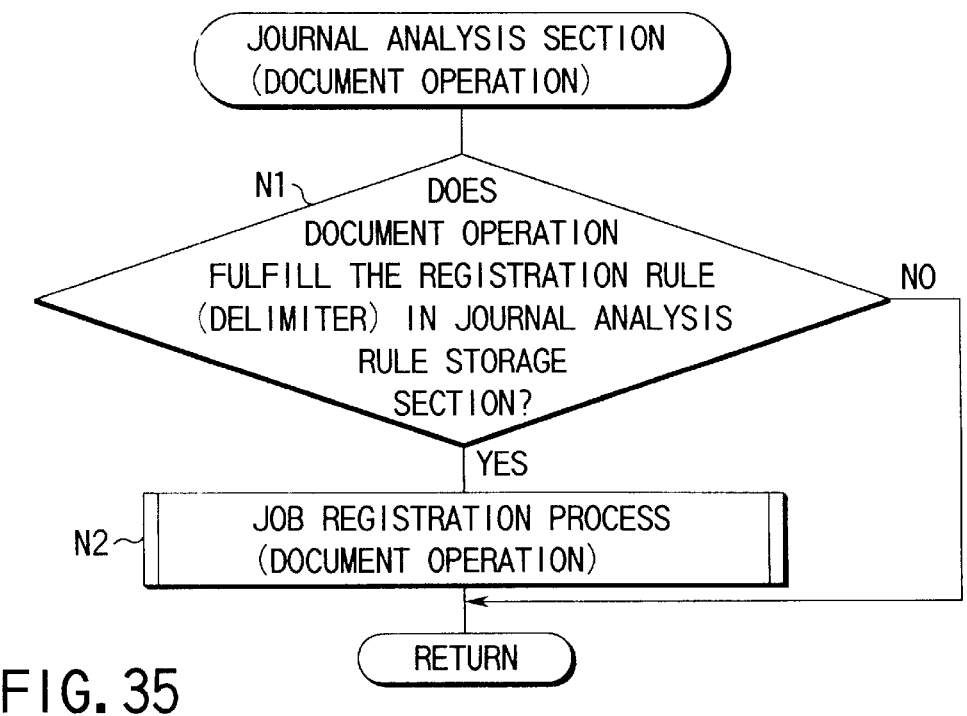
FIG. 35 is a flowchart of the operation procedure at the journal analysis section of the second embodiment.

FIG. 35 is a flowchart of the procedure for the processing done at that time by the journal analysis section 3q.

The journal analysis section 3q judges whether or not the contents of the document operation given in a parameter meet the delimiter rule in the registration rule for the corresponding user name in the journal analysis rule storage section 25 (step N1 of FIG. 35). If the contents meet the rule, the document operation will be determined to be the delimiter of the last operation on the job. Using the document operation as a parameter, the job registration section 3d is called (step N2). Thereafter, control will be returned. If the contents do not meet the delimiter rule in the registration rule, control will be just returned.

Figure 36:
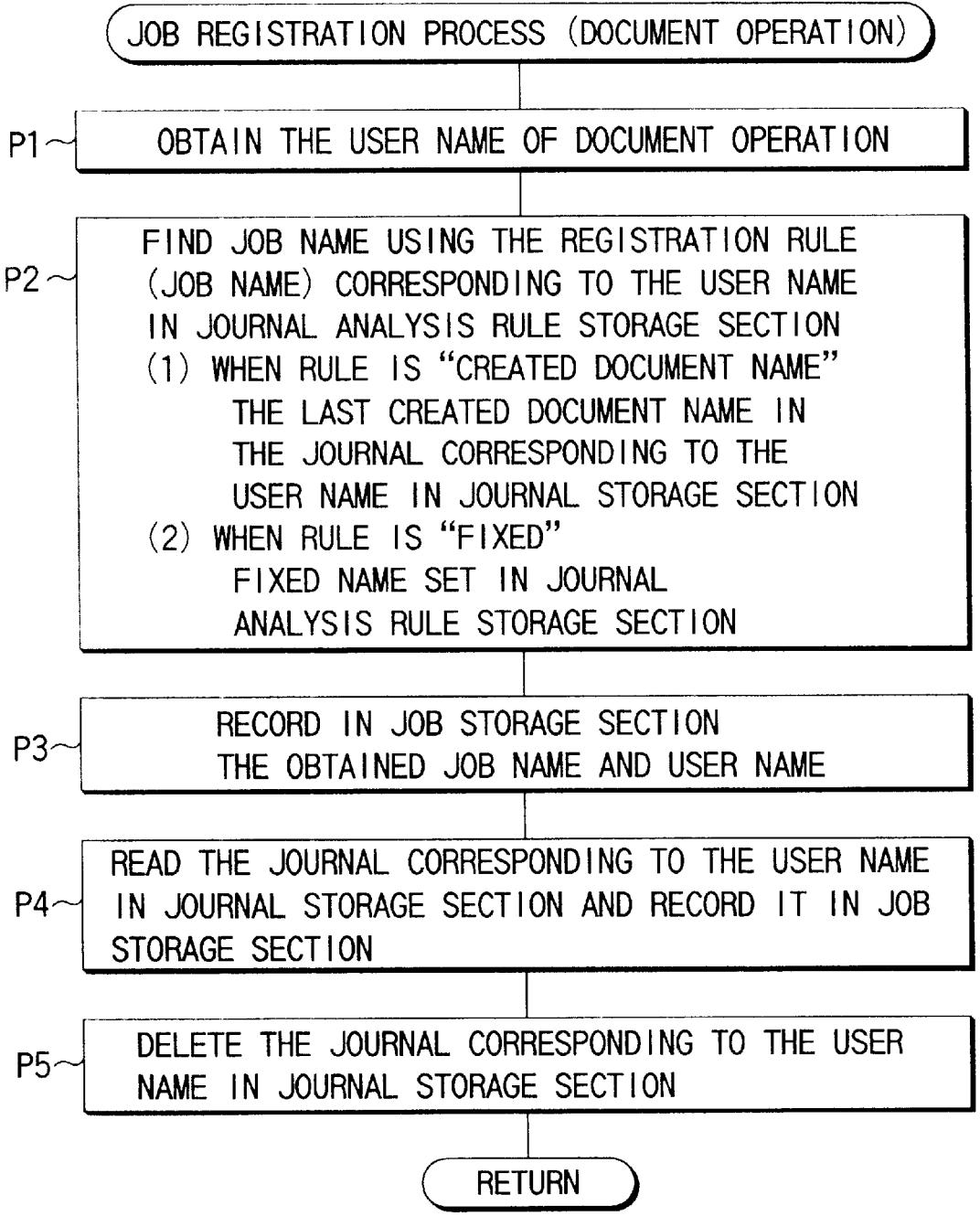
FIG. 36 is a flowchart of the procedure at the job registration process of the second embodiment.

FIG. 36 is a flowchart of the procedure for processing done at that time at the job registration section 3d.

The job registration section 3d extracts the user name from the contents of the document operation given in a parameter (step P1 of FIG. 36) and determines a job name as follows, using the job name rule in the registration rule corresponding to the user name in the journal analysis rule storage section 25 (step P2).

(1) When the job name rule is "CREATED DOCUMENT NAME", the name of the document last created in the journal corresponding to the user name in the journal storage section 24 is found and determined to be the job name.

(2) When the job name rule is "FIXED", the fixed name recorded in the job name rule is determined to be the job name.

The job registration section 3d then records the job name and user name for a new job into the job storage section (step P3). The job registration section reads all of the journals of document operations corresponding to the user name in the journal storage section 24 and records them into the contents of jobs in the job storage section 23 (step P4). Thereafter, all of the journals of document operations corresponding to the user name in the journal storage section 24 are deleted (step P5). Thereafter, control is returned.

FIG. 15 shows an example of the data structure in the job storage section 23 registered by the job registration section 3d when the journal of document operations shown in FIG. 5 has been recorded in accordance with the registration rule in the journal analysis rule storage section 25 of FIG. 29. (The example is the same as in the first embodiment.)

For "JOB ID: J0036", the creation of "DOCUMENT ID: D004" made at "10:30, MAY 13, 1997" by "LUCY" is determined to be the delimiter of a job and is recorded together with reference to "DOCUMENT ID: D001" made at "10:01" as the contents of the job. In this case, "ORGANIZING CATALOGS", the name of the created document, has been recorded as the job name.

For "JOB ID: J004", logout made at "13:30, MAY 13, 1997" by "JACK" is determined to be the delimiter of a job and is recorded together with reference to two documents made at "13:10" and "13:20" as the contents of the job. The fixed "CHECKING JOB" has been recorded as the job name.

With the second embodiment, the journal analysis setting section 3r sets the journal analysis rule to enable the system to monitor the document operation by the user, determine the delimiter of a job and the job name from the journal of document operations, and store the job information into the job storage section 23. This makes it possible to register a job very easily.

Regarding the journal analysis rule, the saving location of a document to be created or the type of a document, image or text, may be used as the monitor rule. Mail transmission or widow change may be used as a delimiter in the registration rule.

Hereinafter, the retrieval and editing of a registered job will be explained.

The same portions of the processing procedure as those in the first embodiment will not be explained.

FIG. 16 (the same as in the first embodiment) shows the job retrieval window which appears when the job retrieval process (step K13 of FIG. 31) at the job retrieval section 3e in the job management tool process of FIG. 31 is started. FIG. 18 (the same as in the first embodiment) is a flowchart of the procedure for the job retrieval process.

FIG. 37 shows the job list window which appears when the job listing process (step F5) is started in the job retrieval process of FIG. 18. FIG. 19 (the same as in the first embodiment) is a flowchart for the job listing process.

When the user specifies the "EDITING JOBS" button on the job list window of FIG. 37, the job editing process of editing the contents of the chosen job is started. FIG. 21 is a flowchart for the job editing process. The job ID of the chosen job is given to the job editing process as a parameter.

In the second embodiment, when the user specifies the "INTEGRATE JOBS" button on the job list window, a plurality of jobs registered by the system can be integrated into one job. This is used when a unit of the jobs registered by the system is too small.

When the user specifies the "DIVIDE JOBS" button on the job list window, the contents of one job registered by the system can be divided into a plurality of jobs. This is used when a unit of the jobs registered by the system is too large.

FIG. 20 (the same as in the first embodiment) shows the job editing window which appears when the job editing process (step G8) is started in the job listing process of FIG. 19. FIG. 21 (the same as in the first embodiment) is a flowchart of the procedure for the job editing process.

FIG. 22 (the same as in the first embodiment) shows the related document retrieval list window which appears when the related document retrieval process (step G7) is started in the job listing process of FIG. 19. FIG. 23 (the same as in the first embodiment) is a flowchart for the related document retrieval process.

FIG. 24 (the same as in the first embodiment) shows the related job retrieval list window which appears when the related job retrieval process is started in the related document retrieval process. FIG. 25 (the same as in the first embodiment) is a flowchart for the related job retrieval process.

FIG. 26 (the same as in the first embodiment) shows an example of the related document retrieval list window.

As described above, the second embodiment produces the same effect as that in the first embodiment. In addition to this feature, the setting of the journal analysis rule by the journal analysis setting section 3r enables the system to monitor the document operations by the user, record the monitoring result, determine the delimiter of a job and the job name from the journal of document operations, and store them in the job storage section 23. This makes it possible to register a document-handling job very easily without imposing the burden on the user who operates on the document, which improves the efficiency of registering jobs remarkably.

In the second embodiment, use of the job integration section and the job division section enables the user to specify the desired button on the job list window to integrate jobs stored i n the job storage section into one job or divide one job into several jobs. This achieves a much higher operability.

While in the first and second embodiments, the creation of and reference to a n ordinary document are us ed as jobs, the jobs a re not limited to these. For instance, the alteration, update, and deletion of a document are also included in the jobs. Reference to meal recipe information by a meal recipe information service and reference to a test and the test results are also included in the jobs. Moreover, the jobs in the present invention also include the act of a user creating a meal recipe in document form and referring to the document and the act of a user creating a document for how to master the use of a video game and referring to the document. The act of just referring to a document is also included in the contents of jobs in the present invention. Furthermore, the approaches described in the embodiment may be written in the form of program code instructions executable by a computer onto a storage medium, such as a magnetic disk (e.g., a floppy disk or hard disk), an optical disk (e.g., a CD-ROM or DVD), or a semiconductor memory. The storage medium may be then applied to various systems. The program may be transmitted for use with various systems. The computers (client PC 10 and server 20) realizing the embodiment of the present invention read the programs recorded on the storage medium and are controlled by the programs, thereby executing the aforementioned processes.

As described above in detail, with the present invention, the addition of the function of acquiring the contents of document-handling jobs and storing them job by job enables the related jobs to be retrieved from a document or the related documents from a job without imposing on the user the burden of operation. This makes it possible to retrieve the necessary documents and jobs more efficiently, which enables various job-handling jobs to be executed efficiently.

Furthermore, with the present invention, the related document can be retrieved from the user name on the job or the job name by providing not only the function of registering the documents used during a job execution, together with the job name and the user name on the job but also a related-document retrieval function. There is also provided the function of registering jobs on the basis of the journal of document operations obtained as a result of the user having operated a document. This enables the necessary document to be retrieved efficiently and quickly without imposing on the user the burden of registering jobs.

Still furthermore, with the present invention, the contents of the related job can be retrieved from the document name or document creator by providing not only the function of registering the documents used during a job execution, together with the job name and the user name on the job but also a related-job retrieval function. There is also provided the function of registering jobs on the basis of the journal of document operations obtained as a result of the user having operated a document. This enables the necessary document to be retrieved efficiently and quickly without imposing on the user the burden of registering jobs.

Still furthermore, with the present invention, not only the related document can be retrieved from the user name on the job or the job name but also the contents of the related job can be retrieved from the document name or document creator by providing not only the function of registering the documents used during a job execution, together with the job name and the user name on the job but also a related-job retrieval function and a related job retrieval function. There is also provided the function of registering jobs on the basis of the journal of document operations obtained as a result of the user having operated a document. This enables the necessary document to be retrieved efficiently and quickly without imposing on the user the burden of registering jobs.

Addition al advantages and modifications will readily occur to those skilled in the art. Therefore, the present invention in its broader aspects is not limited to the specific details, representative devices, and illustrated examples shown and described herein. Accordingly, various modification s may be made without departing fro m the spirit or scope of the general inventive concept as defined by the appended claims and their equivalents.

What is claimed is:

1. A document retrieval apparatus comprising:

document information storage means for storing document information on each document containing a document name and a document creator name;

job information storage means for storing job information on each job containing at least one of a job name, a user name on the job, and contents of the job indicating which document and how it has been used on the job;

journal storage means for storing journals of document operations carried out by users for each job;

means for acquiring the journals of document operations carried out by users on each job, based on monitor rule information specifying journals of document operations to be acquired;

journal registering means for registering the acquired journals of document operations in said journal storage means, job information registration means for extracting journals of document operations from said journal storage means based on registration rule information used for extracting job information to be registered in said job information storage means from among the journals of document operations stored in said journal storage means, and registering the extracted journals as job information in said job information storage means; and means for creating a list of documents related to a predetermined job by referring to both the document information stored in said document information storage means and the job information stored in said job information storage means, and displaying the created list, wherein said registration rule information specifies a delimiter of document operations to be extracted.

2. The apparatus according to claim 1, further comprising editing means for editing the job information stored in said job information storage means.

3. The apparatus according to claim 1, wherein said contents of the job include an operation type indicating whether the document has been referred to or created.

4. The apparatus according to claim 1, wherein said monitor rule information specifies an operation type of document operations to be acquired.

5. The apparatus according to claim 1, wherein said monitor rule information specifies a job duration time of document operations to be acquired.

6. A document retrieval apparatus comprising:

document information storage means for storing document information on each document containing a document name and a document creator name;

job information storage means for storing job information on each job containing at least one of a job name, a user name on the job, and contents of the job indicating which document and how it has been used on the job;

journal storage means for storing journals of document operations carried out by users for each job;

means for acquiring the journals of document operations carried out by users on each job, based on monitor rule information specifying journals of document operations to acquired;

journal registering means for registering the acquired journals of document operations in said journal storage means;

job information registration means for extracting journals of document operations from said journal storage means based on registration rule information used for extracating job information to be registered in said job information storage means from among the journals of document operations stored in said journal storage means, and registering the extracted journals as job information in said job information storage means; and means for creating a list of jobs related to a predetermined document by referring to both the document information stored in said document information storage means and the job information stored in said job information storage means, and displaying the created list, wherein said registration rule information specifies a delimiter of document operations to be extracted.

7. The apparatus according to claim 6, further comprising editing means for editing the job information stored in said job information storage means.

8. The apparatus according to claim 6, wherein said contents of the job include an operation type indicating whether the document has been referred to or created.

9. The apparatus according to claim 6, wherein said monitor rule information specifies an operation type of document operations to be acquired.

10. The apparatus according to claim 6 wherein said monitor rule information specifies a job duration time of document operations to be acquired.

11. A document retrieval method for use in an apparatus including document information storage means for storing document information on each document containing a document name and a document creator name, and job information storage means for storing job information on each job containing at least one of a job name, a user name on the job, and contents of the job indicating which document and how it has been used on the job said method comprising the steps of:

providing journal storage means for storing Journals of document operations carried out by users for each job;

acquiring the journals of document operations carried out by users on each job, based on monitor rule information specifying journals of document operations to be acquired;

registering the acquired journals of document operations in said journal storage means;

extracting journals of document operations from said journal storage means based on registration rule information used for extracting job information to be registered in said job information storage means from among the journals of document operations stored in said journal storage means;

registering the extracted journals as job information in said job information storage means;

creating a list of documents related to a predetermined job by referring to both the document information stored in said document information storage means and the job information stored in said job information storage means; and displaying the created list wherein said registration rule information specifies a delimiter of document operations to be extracted.

12. The method according to claim 11, further comprising the step of enabling the user to edit the job information stored in said job information storage means.

13. The method according to claim 11, wherein said contents of the job include information indicating whether the document has been referred to or created.

14. The method according to claim 11, wherein said monitor rule information specifies an operation type of document operations to be acquired.

15. The method according to claim 11, wherein said monitor rule information specifies a job duration time of document operation to be acquired.

16. A document retrieval method for use in an apparatus including document information storage means for storing document information on each document containing a document name and a document creator name, and job information storage means for storing job information on each job containing at least one of a job name, a user name on the job, and contents of the job indicating which document and how it has been used on the job, said method comprising the steps of:

providing journal storage means for storing journals of document operations carried out by users for each job;

acquiring the journals of document operations carried out by users on each job, based on monitor rule information specifying journals of document operations to be acquired;

registering the acquired journals of document operations in said journal storage means;

extracting journals of document operations from said journal storage means based on registration rule information used for extracting job information to be registered in said job information storage means from among the journals of document operations stored in said journal storage means, wherein said registration rule information specifies a delimiter of document operations to be extracted;

registering the extracted journals as job information in said job information storage means;

creating a list of jobs related to a predetermined document by referring to both the document information stored in said document information storage means and the job information stored in said job information storage means; and displaying the created list.

17. The method according to claim 16, further comprising the step of enabling the user to edit the job information stored in said job information storage means.

18. The method according to claim 16, wherein said contents of the job include information indicating whether the document has been referred to or created.

19. The method according to claim 16, wherein said monitor rule information specifies an operation type of document operations to be acquired.

20. The method according to claim 16, wherein said monitor rule information specifies a job duration time of document operations to be acquired.

* * * * *

UNITED STATES PATENT AND TRADEMARK OFFICE
CERTIFICATE OF CORRECTION

PATENT NO. : 6,119,117
DATED : September 12, 2000
INVENTOR(S) : Nobuhisa Yoda et al.

It is certified that error appears in the above-identified patent and that said Letters Patent is hereby corrected as shown below:

<u>Title page,</u>
Item [57] ABSTRACT,
Line 1, after "registered" insert a period.

<u>Column 23, claim 6,</u>
Line 23, "to acquired" should read -- to be acquired --.
Line 30, "extracating" should read -- extracting --.

<u>IColumn 23, claim 11,</u>
Line 63, "job said method" should read -- job, said method --.
Line 66, "Journals" should read -- journals --.

<u>Column 24, claim 11,</u>
Line 22, after "created list", insert a comma.

Signed and Sealed this

Twelfth Day of March, 2002

Attest:

*Attesting Officer*

JAMES E. ROGAN
*Director of the United States Patent and Trademark Office*